(12) United States Patent
Corman et al.

(10) Patent No.: US 9,094,102 B2
(45) Date of Patent: *Jul. 28, 2015

(54) HALF-DUPLEX PHASED ARRAY ANTENNA SYSTEM

(71) Applicant: VIASAT, INC., Carlsbad, CA (US)

(72) Inventors: David W Corman, Gilbert, AZ (US); Donald L Runyon, Johns Creek, GA (US); David Hancharik, Norcross, GA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/334,280

(22) Filed: Jul. 17, 2014

(65) Prior Publication Data

US 2014/0348035 A1    Nov. 27, 2014

Related U.S. Application Data

(63) Continuation of application No. 12/759,112, filed on Apr. 13, 2010, now Pat. No. 8,817,672.

(60) Provisional application No. 61/265,605, filed on Dec. 1, 2009, provisional application No. 61/237,967, filed (Continued)

(51) Int. Cl.
*H04B 7/005* (2006.01)
*H04B 1/44* (2006.01)
(Continued)

(52) U.S. Cl.
CPC .. *H04B 1/44* (2013.01); *H01Q 3/26* (2013.01); *H01Q 3/2647* (2013.01); *H01Q 3/30* (2013.01); *H01Q 21/24* (2013.01); *H01Q 25/02* (2013.01); *H04L 5/16* (2013.01)

(58) Field of Classification Search
USPC .................. 370/203, 273, 276, 278, 295; 455/276.1, 277.1
See application file for complete search history.

(56) References Cited

U.S. PATENT DOCUMENTS

| | | |
|---|---|---|
| 3,119,965 A | 1/1964 | Phillips |
| 3,842,362 A | 10/1974 | Dimon |
| 4,318,104 A | 3/1982 | Enein |
| 4,697,281 A | 9/1987 | O'Sullivan |
| 4,857,777 A | 8/1989 | Altes |

(Continued)

FOREIGN PATENT DOCUMENTS

| | | |
|---|---|---|
| EP | 0762660 A2 | 3/1997 |
| EP | 1193861 A2 | 4/2002 |

(Continued)

OTHER PUBLICATIONS

Notice of Allowance mailed in U.S. Appl. No. 14/216,760 on Dec. 15, 2014, 9 pgs.

(Continued)

*Primary Examiner* — Phuc Tran

(57) ABSTRACT

In an exemplary embodiment, a phased array antenna comprises a bidirectional antenna polarizer and is configured for bidirectional operation. The bidirectional antenna polarizer may combine active implementations of power splitters, power combiners, and phase shifters. Furthermore, in another exemplary embodiment a bidirectional antenna polarizer has extensive system flexibility and field reconfigurability. In yet another exemplary embodiment, the bidirectional phased array antenna operates in "radar-like" applications where the transmit and receive functions operate in half-duplex fashion. Furthermore, in exemplary embodiments, the phased array antenna is configured to operate over multiple frequency bands and/or multiple polarizations.

18 Claims, 9 Drawing Sheets

Related U.S. Application Data on Aug. 28, 2009, provisional application No. 61/259,375, filed on Nov. 9, 2009, provisional application No. 61/234,513, filed on Aug. 17, 2009, provisional application No. 61/222,354, filed on Jul. 1, 2009, provisional application No. 61/168,913, filed on Apr. 13, 2009, provisional application No. 61/259,049, filed on Nov. 6, 2009, provisional application No. 61/234,521, filed on Aug. 17, 2009, provisional application No. 61/265,587, filed on Dec. 1, 2009, provisional application No. 61/265,596, filed on Dec. 1, 2009, provisional application No. 61/222,363, filed on Jul. 1, 2009.

(51) Int. Cl.
| | | |
|---|---|---|
| *H01Q 3/26* | (2006.01) | |
| *H01Q 3/30* | (2006.01) | |
| *H01Q 21/24* | (2006.01) | |
| *H01Q 25/02* | (2006.01) | |
| *H04L 5/16* | (2006.01) | |

(56) References Cited

U.S. PATENT DOCUMENTS

| | | |
|---|---|---|
| 4,857,778 A | 8/1989 | Hague |
| 4,896,374 A | 1/1990 | Waugh et al. |
| 4,907,003 A | 3/1990 | Marshall et al. |
| 4,955,080 A | 9/1990 | Wagai et al. |
| 4,965,602 A | 10/1990 | Kahrilas et al. |
| 4,994,773 A | 2/1991 | Chen et al. |
| 5,038,147 A | 8/1991 | Cerro et al. |
| 5,045,822 A | 9/1991 | Mohwinkel |
| 5,086,302 A | 2/1992 | Miller |
| 5,128,687 A | 7/1992 | Fay |
| 5,270,719 A | 12/1993 | Roth |
| 5,351,053 A | 9/1994 | Wicks et al. |
| 5,418,815 A | 5/1995 | Ishikawa et al. |
| 5,539,413 A | 7/1996 | Farrell et al. |
| 5,848,060 A | 12/1998 | Dent |
| 5,907,815 A | 5/1999 | Grimm et al. |
| 5,942,929 A | 8/1999 | Aparin |
| 5,966,049 A | 10/1999 | Yuen et al. |
| 5,966,371 A | 10/1999 | Sherman |
| 6,005,515 A | 12/1999 | Allen et al. |
| 6,061,553 A | 5/2000 | Matsuoka et al. |
| 6,232,837 B1 | 5/2001 | Yoo et al. |
| 6,326,845 B1 | 12/2001 | Miyaji et al. |
| 6,411,824 B1 | 6/2002 | Eidson |
| 6,424,281 B1 | 7/2002 | Liaw et al. |
| 6,597,899 B2 | 7/2003 | Souetinov et al. |
| 6,611,230 B2 | 8/2003 | Phelan |
| 6,784,817 B2 | 8/2004 | Matsuura et al. |
| 6,853,248 B2 | 2/2005 | Weldon |
| 6,946,990 B2 | 9/2005 | Monk |
| 7,081,788 B2 | 7/2006 | Hagari |
| 7,098,859 B2 | 8/2006 | Shimawaki et al. |
| 7,164,738 B2 | 1/2007 | Miyamoto et al. |
| 7,177,615 B2 | 2/2007 | Ono |
| 7,180,447 B1 | 2/2007 | Jacomb-Hood et al. |
| 7,319,345 B2 | 1/2008 | Farjad-rad et al. |
| 7,355,470 B2 | 4/2008 | Sorrells et al. |
| 7,378,902 B2 | 5/2008 | Sorrells et al. |
| 7,400,193 B2 | 7/2008 | Wyatt |
| 7,408,507 B1 | 8/2008 | Paek et al. |
| 7,420,423 B2 | 9/2008 | Lee et al. |
| 7,421,036 B2 | 9/2008 | Sorrells et al. |
| 7,436,370 B2 | 10/2008 | Blanton |
| 7,460,623 B1 | 12/2008 | Radionov et al. |
| 7,620,129 B2 | 11/2009 | Sorrells et al. |
| 7,672,653 B2 | 3/2010 | Cowley et al. |
| 7,715,815 B2 | 5/2010 | Gomez |
| 7,728,784 B2 | 6/2010 | Mohamadi |
| 7,746,764 B2 | 6/2010 | Rawlins et al. |
| 7,750,733 B2 | 7/2010 | Sorrells et al. |
| 7,755,430 B2 | 7/2010 | Imagawa |
| 7,817,757 B2 | 10/2010 | Hidaka |
| 7,826,550 B2 | 11/2010 | Rofougaran |
| 7,885,682 B2 | 2/2011 | Sorrells et al. |
| 8,013,784 B2 | 9/2011 | Margomenos et al. |
| 8,030,998 B2 | 10/2011 | Corman |
| 8,085,877 B2 | 12/2011 | Rofougaran |
| 8,160,530 B2 | 4/2012 | Corman et al. |
| 8,228,232 B2 | 7/2012 | Corman et al. |
| 8,289,209 B2 | 10/2012 | Corman et al. |
| 8,400,235 B2 | 3/2013 | Corman |
| 8,410,980 B2 | 4/2013 | Corman et al. |
| 8,416,882 B2 | 4/2013 | Corman et al. |
| 8,452,251 B2 | 5/2013 | Saunders |
| 8,587,492 B2 | 11/2013 | Runyon |
| 8,639,204 B2 | 1/2014 | Corman et al. |
| 8,693,970 B2 | 4/2014 | Corman et al. |
| 8,699,626 B2 | 4/2014 | Saunders et al. |
| 8,737,531 B2 | 5/2014 | Saunders |
| 8,773,219 B2 | 7/2014 | Corman |
| 8,817,672 B2 * | 8/2014 | Corman et al. ............... 370/278 |
| 8,837,632 B2 * | 9/2014 | Saunders ...................... 375/295 |
| 8,995,943 B2 | 3/2015 | Corman et al. |
| 9,020,069 B2 | 4/2015 | Saunders et al. |
| 2002/0080066 A1 | 6/2002 | Dent |
| 2002/0080084 A1 | 6/2002 | Strickland |
| 2002/0113648 A1 | 8/2002 | Miyaji et al. |
| 2002/0151274 A1 | 10/2002 | Rosen et al. |
| 2003/0016085 A1 | 1/2003 | Yamazaki |
| 2003/0030895 A1 | 2/2003 | So et al. |
| 2003/0080898 A1 | 5/2003 | Wang et al. |
| 2003/0102911 A1 | 6/2003 | Raghavan et al. |
| 2003/0151550 A1 | 8/2003 | Chen et al. |
| 2003/0156060 A1 | 8/2003 | Revankar et al. |
| 2003/0162566 A1 | 8/2003 | Shapira et al. |
| 2003/0190922 A1 | 10/2003 | Dalvi et al. |
| 2004/0095190 A1 | 5/2004 | Klaren et al. |
| 2004/0119636 A1 | 6/2004 | Edvardsson et al. |
| 2004/0121750 A1 | 6/2004 | Nation |
| 2004/0229584 A1 | 11/2004 | Fischer et al. |
| 2004/0233099 A1 | 11/2004 | Jenabi |
| 2005/0113052 A1 | 5/2005 | Rabinovich et al. |
| 2005/0151698 A1 | 7/2005 | Mohamadi |
| 2006/0045038 A1 | 3/2006 | Kay et al. |
| 2006/0170499 A1 | 8/2006 | Rahman et al. |
| 2006/0183434 A1 | 8/2006 | Westra et al. |
| 2007/0248186 A1 | 10/2007 | Sorrells et al. |
| 2007/0275674 A1 | 11/2007 | Chien |
| 2007/0279061 A1 | 12/2007 | Erickson et al. |
| 2007/0280384 A1 | 12/2007 | Hidaka |
| 2008/0051053 A1 | 2/2008 | Fedan |
| 2008/0055151 A1 | 3/2008 | Hudson et al. |
| 2008/0129408 A1 | 6/2008 | Nagaishi et al. |
| 2008/0129634 A1 | 6/2008 | Pera et al. |
| 2008/0218424 A1 | 9/2008 | Blanton |
| 2008/0233865 A1 | 9/2008 | Malarky et al. |
| 2008/0304609 A1 | 12/2008 | Losic |
| 2009/0012768 A1 | 1/2009 | Son et al. |
| 2009/0015474 A1 | 1/2009 | Wicks et al. |
| 2009/0086851 A1 | 4/2009 | Rofougaran |
| 2009/0091384 A1 | 4/2009 | Sorrells et al. |
| 2010/0039174 A1 | 2/2010 | Teetzel |
| 2010/0073085 A1 | 3/2010 | Sorrells et al. |
| 2010/0097138 A1 | 4/2010 | Sorrells et al. |
| 2010/0225389 A1 | 9/2010 | Teetzel |
| 2010/0259312 A1 | 10/2010 | Menon et al. |
| 2010/0260285 A1 | 10/2010 | Corman et al. |
| 2010/0261440 A1 | 10/2010 | Corman et al. |
| 2010/0321107 A1 | 12/2010 | Honcharenko |
| 2011/0006948 A1 | 1/2011 | Larregle et al. |
| 2011/0142104 A1 | 6/2011 | Coldrey et al. |
| 2013/0058382 A1 | 3/2013 | Matsuura |
| 2013/0135022 A1 | 5/2013 | Saunders |
| 2013/0136209 A1 | 5/2013 | Saunders et al. |
| 2014/0104106 A1 | 4/2014 | Corman et al. |
| 2014/0191789 A1 | 7/2014 | Saunders |
| 2014/0192926 A1 | 7/2014 | Saunders et al. |
| 2014/0197987 A1 | 7/2014 | Corman et al. |

(56) References Cited

U.S. PATENT DOCUMENTS

FOREIGN PATENT DOCUMENTS

| | | |
|---|---|---|
| EP | 1501156 A1 | 1/2005 |
| EP | 2419964 A1 | 2/2012 |
| EP | 2419963 B1 | 11/2013 |
| JP | 5617536 | 2/1981 |
| JP | 09326629 | 12/1997 |
| JP | 2002057515 | 2/2002 |
| JP | 2002141849 | 5/2002 |
| JP | 2003168938 | 6/2003 |
| JP | 2003229738 | 8/2003 |
| JP | 2004241972 | 8/2004 |
| JP | 2005045790 | 2/2005 |
| JP | 5677697 | 1/2015 |
| JP | 20155994 | 1/2015 |
| TW | I264883 | 10/2006 |
| TW | 200715705 | 4/2007 |
| TW | I284465 | 7/2007 |
| WO | WO-98/56123 A1 | 12/1998 |
| WO | WO-99/45609 A1 | 9/1999 |
| WO | WO-00/03456 A1 | 1/2000 |
| WO | WO-00/33419 A1 | 6/2000 |
| WO | WO-02/41442 A1 | 5/2002 |
| WO | WO-03/036756 A2 | 5/2003 |
| WO | WO-2006/071153 A1 | 7/2006 |
| WO | WO-2008/126985 A1 | 10/2008 |
| WO | WO-2009/043917 A1 | 4/2009 |
| WO | WO-2010/120756 A1 | 10/2010 |
| WO | WO-2010/120760 A2 | 10/2010 |
| WO | WO-2010/120762 A2 | 10/2010 |
| WO | WO-2010/120767 A2 | 10/2010 |
| WO | WO-2010/120768 A2 | 10/2010 |
| WO | WO-2010/120770 A1 | 10/2010 |
| WO | WO-2010/120779 A2 | 10/2010 |
| WO | WO-2010/120790 A2 | 10/2010 |

OTHER PUBLICATIONS

Notice of Allowance mailed in Japanese Patent Application No. 2012-506124 on Dec. 19, 2014, 3 pgs.
Ayari et al., "Automatic Test Vector Generation for Mixed-Signal Circuits", EDTC '95 Proceedings of the 1995 European Conference on Design and Test, Mar. 1995, 6 pgs.
HSIAO, "Analysis of Interleaved Arrays of Waveguide Elements", IEEE Transactions on Antennas and Propagation, vol. 19, No. 6, Nov. 1971, pp. 729-735.
Koh et al., "0.13-μm CMOS Phase Shifters for X-, Ku-, and K-Band Phased Arrays", IEEE Journal of Solid-State Circuits, vol. 42, No. 11, Nov. 2007, pp. 2535-2546.
Koh et al., "A Q-Band (40-45 GHz) 16-Element Phased-Array Transmitter in 0.18- μm SiGe BiCMOS Technology", IEEE, 2008, pp. 225-228.
Koh et al., "An X- and Kμ-Band 8-Element Phased-Array Receiver in 0.18- μm SiGe BiCMOS Technology", IEEE, vol. 43, No. 6, Jun. 2008, pp. 1360-1371.
Lee et al., "Broadband Quadrature Hybrid Design Using Metamaterial Transmission Line and Its Application in the Broadband Continuous Phase Shifter", IEEE/MTT-S International, Microwave Symposium, Jun. 2007, pp. 1745-1748.
Safarian et al., "Distributed Active Power Combiners and Splitters for Multi-Antenna UWB Transceivers", IEEE, Sep. 2006, pp. 138-141.
Strassberg, "RF-Vector-Signal Generator Combines High Throughput, Low Phase Noise", EDN, Oct. 6, 2009, 2 pgs.
Tokumitsu et al., "Active Isolator, Combiner, Divider, and Magic-T as Miniaturized Function Blocks", Gallium Arsenide Integrated Circuit (GaAs IC) Symposium, Nov. 1988, pp. 273-276.
Viallon et al., "An Original SiGe Active Differential Output Power Splitter for Millimetre-wave Applications", Microwave Conference, Oct. 2003, 4 pgs.
Zheng et al., "Full 360° Vector-Sum Phase-Shifter for Microwave System Applications", IEEE Transactions on Circuits and Systems I: Regular Papers, vol. 57, No. 4, Apr. 2010, pp. 752-758.

International Search Report and Written Opinion mailed in International Application No. PCT/US2010/030881 on Jul. 19, 2010, 8 pgs.
International Search Report and Written Opinion mailed in International Application No. PCT/US2010/030864 on Aug. 23, 2010, 8 pgs.
International Search Report and Written Opinion mailed in International Application No. PCT/US2010/030876 on Oct. 27, 2010, 7 pgs.
International Search Report and Written Opinion mailed in International Application No. PCT/US2010/030871 on Nov. 18, 2010, 8 pgs.
International Search Report and Written Opinion mailed in International Application No. PCT/US2010/030868 on Nov. 26, 2010, 8 pgs.
International Search Report and Written Opinion mailed in International Application No. PCT/US2010/030877 on Nov. 26, 2010, 8 pgs.
International Search Report and Written Opinion mailed in International Application No. PCT/US2010/030892 on Nov. 26, 2010, 7 pgs.
International Search Report and Written Opinion mailed in International Application No. PCT/US2010/030906 on Nov. 30, 2010, 9 pgs.
International Preliminary Report on Patentability mailed in International Application No. PCT/US2010/030877 on Jul. 18, 2011, 7 pgs.
International Preliminary Report on Patentability mailed in International Application No. PCT/US2010/030892 on Jul. 18, 2011, 6 pgs.
International Preliminary Report on Patentability mailed in International Application No. PCT/US2010/030906 on Jul. 18, 2011, 6 pgs.
International Preliminary Report on Patentability mailed in International Application No. PCT/US2010/030881 on Oct. 18, 2011, 5 pgs.
International Preliminary Report on Patentability mailed in International Application No. PCT/US2010/030864 on Oct. 18, 2011, 5 pgs.
International Preliminary Report on Patentability mailed in International Application No. PCT/US2010/030876 on Oct. 18, 2011, 5 pgs.
International Preliminary Report on Patentability mailed in International Application No. PCT/US2010/030871 on Oct. 18, 2011, 5 pgs.
International Preliminary Report on Patentability mailed in International Application No. PCT/US2010/030868 on Oct. 18, 2011, 6 pgs.
Japanese Official Action, Notice of Reasons for Rejection mailed in Japanese Patent Application No. 2012-506124 on Feb. 19, 2014, 5 pgs. including English language translation.
Japanese Official Action, Notice of Reasons for Rejection for Japanese Patent Application No. 2012-506127, mailed Oct. 29, 2013, 8 pgs. including English language translation.
Notice of Allowance mailed in Japanese Patent Application No. 2012-506127 on Jul. 23, 2014, 3 pgs.
Japanese Official Action, Notice of Reasons for Rejection mailed in Japanese Patent Application No. 2012-506132 on Oct. 31, 2013, 4 pgs. including English language translation.
Notice of Allowance mailed in Japanese Patent Application No. 2012-506132 on Jul. 9, 2014, 3 pgs.
Extended European Search Report mailed in European Patent Application No. 10765025.1 on Dec. 12, 2013, 6 pgs.
Non-Final Office Action mailed in U.S. Appl. No. 14/177,612 on May 21, 2014, 10 pgs.
Notice of Allowance mailed in U.S. Appl. No. 14/177,612 on Aug. 4, 2014, 8 pgs.
Extended European Search Report mailed in European Patent Application No. 13193382.2 on Apr. 2, 2014, 6 pgs.
Non-Final Office Action mailed in U.S. Appl. No. 14/216,760 on Sep. 26, 2014, 5 pgs.
Examination Report mailed in European Patent Application No. 10716940.1 on Oct. 24, 2014, 5 pgs.
Non-Final Office Action mailed in U.S. Appl. No. 14/176,092 on Oct. 20, 2014, 9 pgs.
Extended European Search Report mailed in European Patent Application No. 13195576.7 on Jan. 26, 2015, 8 pgs.
Office Action mailed in Taiwanese Patent Application No. 099111400 on Jan. 21, 2015, 4 pgs. including English language translation.
U.S. Appl. No. 14/617,630, filed Feb. 9, 2015, 158 pgs.
Notice of Allowance mailed in U.S. Appl. No. 14/176,092 on Mar. 3, 2015, 7 pgs.
Notice of Reasons for Rejection mailed in Japanese Patent Application No. 2014-169015 on Apr. 17, 2015, 35 pgs. including English language translation.
Office Action and Search Report mailed in Taiwanese Patent Application No. 99111390 on Apr. 23, 2015, 4 pgs.
Office Action and Search Report mailed in Taiwanese Patent Application No. 99111391 on May 5, 2015, 5 pgs.

* cited by examiner

Distribution Pattern

Practical Distribution Illustration

HALF-DUPLEX PHASED ARRAY ANTENNA SYSTEM

CROSS REFERENCE TO RELATED APPLICATIONS

This application is a continuation of U.S. patent application Ser. No. 12/759,112, entitled "Half-Duplex Phased Array Antenna System", filed on Apr. 13, 2010, which is incorporated by reference herein. U.S. patent application Ser. No. 12/759,112 is a non-provisional of U.S. Provisional Application No. 61/237,967, entitled "ACTIVE BUTLER AND BLASS MATRICES," which was filed on Aug. 28, 2009. U.S. patent application Ser. No. 12/759,112 is also a non-provisional of U.S. Provisional Application No. 61/259,375, entitled "ACTIVE HYBRIDS FOR ANTENNA SYSTEMS," which was filed on Nov. 9, 2009. U.S. patent application Ser. No. 12/759,112 is a non-provisional of U.S. Provisional Application No. 61/234,513, entitled "ACTIVE FEED FORWARD AMPLIFIER," which was filed on Aug. 17, 2009. U.S. patent application Ser. No. 12/759,112 is a non-provisional of U.S. Provisional Application No. 61/222,354, entitled "ACTIVE PHASED ARRAY ARCHITECTURE," which was filed on Jul. 1, 2009. U.S. patent application Ser. No. 12/759,112 is a non-provisional of U.S. Provisional Application No. 61/168,913, entitled "ACTIVE COMPONENT PHASED ARRAY ANTENNA," which was filed on Apr. 13, 2009. U.S. patent application Ser. No. 12/759,112 is also a non-provisional of U.S. Provisional Application No. 61/259,049, entitled "DYNAMIC REAL-TIME POLARIZATION FOR ANTENNAS," which was filed on Nov. 6, 2009. U.S. patent application Ser. No. 12/759,112 is a non-provisional of U.S. Provisional Application No. 61/234,521, entitled "MULTI-BAND MULTI-BEAM PHASED ARRAY ARCHITECTURE," which was filed on Aug. 17, 2009. U.S. patent application Ser. No. 12/759,112 is a non-provisional of U.S. Provisional Application No. 61/265,605, entitled "HALF-DUPLEX PHASED ARRAY ANTENNA SYSTEM," which was filed on Dec. 1, 2009. U.S. patent application Ser. No. 12/759,112 is a non-provisional of U.S. Provisional Application No. 61/265,587, entitled "FRAGMENTED APERTURE KA/KU-BAND," which was filed on Dec. 1, 2009. U.S. patent application Ser. No. 12/759,112 is a non-provisional of U.S. Provisional Application No. 61/265,596, entitled "ANTENNA TILE DEVICE AND DESIGN," which was filed on Dec. 1, 2009. U.S. patent application Ser. No. 12/759,112 is a non-provisional of U.S. Provisional Application No. 61/222,363, entitled "BIDIRECTIONAL ANTENNA POLARIZER," which was filed on Jul. 1, 2009. All of the contents of the previously identified applications are hereby incorporated by reference for any purpose in their entirety.

BACKGROUND OF THE INVENTION

A phased array antenna uses multiple radiating elements to transmit, receive, or transmit and receive radio frequency (RF) signals. Phased array antennas may be used in various capacities, including communications on the move (COTM) antennas, communications on the pause (COTP) antennas, satellite communication (SATCOM) airborne terminals, SATCOM mobile communications, Local Multipoint Distribution Service (LMDS), wireless point to point (PTP) microwave systems, and SATCOM earth terminals. Furthermore, the typical components in a phased array antenna are distributed components that are therefore frequency sensitive and designed for specific frequency bands. A typical SATCOM systems has a forward link that is time division multiplexed (TDM) and a return link that is time division multiple access (TDMA). Receive and transmit functions need not be accomplished simultaneously and synchronization and time standards for synchronizations are typical factors in most, if not all, of the aforementioned communication systems for operational bandwidth efficiency.

A typical electronically steerable phased array antenna comprises an assembly of phase shifters, power splitters, power combiners, and hybrids. Additionally, a typical electronically steerable phased array requires at least a few of these components at every radiating element in the phased array, which increases the cost and complexity of the architecture. Additionally, an electronically steerable phased array antenna is more complex if operating as a half-duplex function. A half-duplex phased array antenna is configured to transmit and receive through the same radiating element.

A typical digital phase shifter uses switched delay lines, is physically large, and operates over a narrow band of frequencies due to its distributed nature. Another type of typical digital phase shifter implements a switched high-pass low-pass filter architecture which has better operating bandwidth compared to a switched delay line but is still physically large. Also, these phase shifters are often made on gallium arsenide (GaAs). Though other materials may be used, GaAs is a higher quality material designed and controlled to provide good performance of electronic devices. However, in addition to being a higher quality material than other possible materials, GaAs is also more expensive and more difficult to manufacture. The typical phased array components take up a lot of area on the GaAs, resulting in higher costs. Furthermore, a standard phase shifter involving solid state circuits has high radio frequency (RF) power loss, which is typically about (2*n) dB of loss, where n is the number of phase bits in the phase shifter. Another prior art embodiment uses RF MEMS switches and has lower power loss but still consumes similar space and is generally incompatible with monolithic solutions.

In addition to digital phase shifters, quadrature hybrids or other differential phase generating hybrids are also used in a variety of RF applications. In an exemplary embodiment, quadrature hybrids are used for generating circular polarization signals, power combining, or power splitting. In an exemplary embodiment, the outputs of a quadrature hybrid have equal amplitude and a nominally 90° phase difference. In another typical embodiment, the quadrature hybrid is implemented as a distributed structure, such as a Lange coupler, a branchline coupler, and/or the like. A 180° hybrid, such as a magic tee or a ring hybrid, results in a nominally 180° phase shift. In general, quadrature hybrids and 180° hybrids are limited in frequency bandwidth and require significant physical space. Additionally, since the structures are distributed in nature, their physical size increases with decreasing frequency. Moreover, the quadrature hybrids and 180° hybrids are typically made of GaAs and have associated RF power loss on the order of 3-4 dB per hybrid when used as a power splitter, and an associated RF power loss of about 1 dB when used as a power combiner.

In-phase power combiners and in-phase power splitters are also used in a variety of RF applications. In an exemplary embodiment, the outputs of an in-phase hybrid have equal amplitude and a substantially zero differential phase difference. In another exemplary embodiment, the inputs of an in-phase hybrid configured as a power combiner encounter substantially zero differential phase and amplitude shift. In a prior art embodiment, the in-phase hybrid is implemented as a distributed structure such as a Wilkinson coupler. In general, an in-phase hybrid is limited in frequency band and requires significant physical space. Additionally, since the structure is distributed in nature, the physical size increases with decreasing frequency. The in-phase hybrid is typically made of GaAs. Moreover, the in-phase hybrid generally has associated RF power loss on the order of 3-4 dB per hybrid when used as a power splitter and an associated RF power loss of about 1 dB when used as a power combiner.

Additionally, typical phased array antennas only form a single beam at a time and are often not capable of polarization agility. In order to form additional beams and/or have polarization agility ability from the same radiating aperture, additional phase shifting and power splitting or combining components are required at every radiating element. These additional components are typically distributed in nature, require significant physical space, are lossy, and only operate over relatively narrow frequency bands. For these reasons, polarization agile, multiple beam phased array antennas that can operate over multiple frequency bands are difficult to realize in practice. Furthermore, the typical components in a phased array antenna are distributed components that are therefore frequency sensitive and designed for specific frequency bands.

The polarizer of a prior art phased array antenna is typically specific to a particular polarization. It may be linear, circular, or elliptical, but in general is not able to be electronically reconfigured to handle different polarizations. Furthermore, a typical communications-based phased array antenna only uses a radiating element for either transmitting or receiving, but does not switch between the two functions. This is generally due to the transmit and receive frequency bands being sufficiently far apart to preclude a single radiating element from supporting both bands with adequate efficiency.

Thus, a need exists for a phased array antenna that is not frequency limited or polarization specific. Also, a need exists for an antenna polarizer that is reconfigurable for different polarizations, and able to transmit and receive using the same radiating element in half-duplex fashion.

SUMMARY

In an exemplary embodiment, a phased array antenna comprises a half-duplex architecture within a single aperture. The phased array antenna is configured to transmit and receive radio frequency signals through common radiating elements. In an exemplary embodiment, the transmitting and receiving periods do not occur simultaneously, which enables isolating the various signals. The radio frequency signals are adjusted for both polarization control and beam steering. In a receive embodiment, multiple RF signals are received and combined into at least one receive beam output. In a transmit embodiment, at least one transmit beam input is divided and transmitted through multiple radiating elements.

Furthermore, in exemplary embodiments, the phased array antenna is configured to operate over multiple frequency bands and/or multiple polarizations. The phased array antenna replaces traditional distributed components and GaAs functions with active components to operate an electronically steerable multiple beam phased array antenna. The wideband nature of the active components allows for operation over multiple frequency bands simultaneously. Furthermore, the antenna polarization may be static or dynamically controlled at the subarray or individual radiating element level.

Advantages of the exemplary phased array antenna include increased system capacity and flexibility. Furthermore, an antenna capable of operating over multiple frequency bands optimizes system availability. This system may be implemented in mobile applications, or fixed position applications where multiple systems are desired. Also, a single antenna can communicate with multiple systems and/or users, allowing for increased capacity and availability.

In an exemplary embodiment, a phased array antenna comprises a bidirectional antenna polarizer and is configured for bidirectional operation. The bidirectional antenna polarizer may combine active implementations of power splitters, power combiners, and phase shifters. Furthermore, in another exemplary embodiment a bidirectional antenna polarizer has extensive system flexibility and field reconfigurability. In yet another exemplary embodiment, the bidirectional phased array antenna operates in "radar-like" applications where the transmit and receive functions operate in half-duplex fashion.

BRIEF DESCRIPTION OF THE DRAWING FIGURES

A more complete understanding of the present invention may be derived by referring to the detailed description and claims when considered in connection with the drawing figures, wherein like reference numbers refer to similar elements throughout the drawing figures, and:

DETAILED DESCRIPTION OF THE INVENTION

While exemplary embodiments are described herein in sufficient detail to enable those skilled in the art to practice the invention, it should be understood that other embodiments may be realized and that logical material, electrical, and mechanical changes may be made without departing from the spirit and scope of the invention. Thus, the following detailed description is presented for purposes of illustration only.

A phased array antenna generally comprises multiple radiating elements, with each radiating element having a polarization component. In an exemplary embodiment, the radiating element has spatially orthogonal linear polarizations, spatially and electrically orthogonal circular polarizations, or spatially orthogonal and electrically non-orthogonal elliptical polarizations. In an exemplary embodiment, a phased array antenna comprises various components. The various components may include a vector generator, an active power splitter, an active power combiner, or the like. Furthermore, in an exemplary embodiment, the phased array antenna comprises a patch antenna. Though a patch antenna is illustrated in the figures and described herein, other types of radiating elements may be implemented. Such radiating elements include a fragmented radiator, a feed horn antenna, a cross-notched antenna, a slot antenna, and the like.

In an exemplary embodiment, each radiating element has two feed ports and results in an unbalanced feed system. In yet another exemplary embodiment, each radiating element has three feed ports and results in a partially balanced feed system. In another exemplary embodiment, each radiating element has four feed ports and results in a fully balanced feed system.

In an exemplary embodiment, a phased array antenna with two feed ports is configured to generate and control different polarizations. Exemplary polarization states include a single circular polarization state, a single elliptical polarization state, a single linear polarization state, and two orthogonal linear polarization states.

The radiating elements may be in communication with an RF integrated circuit (RFIC). In an exemplary embodiment, the RFIC is configured to divide, alter, and re-combine the basis polarizations to other orthogonal polarization states. The RF signal corresponding to the net polarization state in the RFIC may additionally be combined in a beam-forming network of the array.

Figure 4:
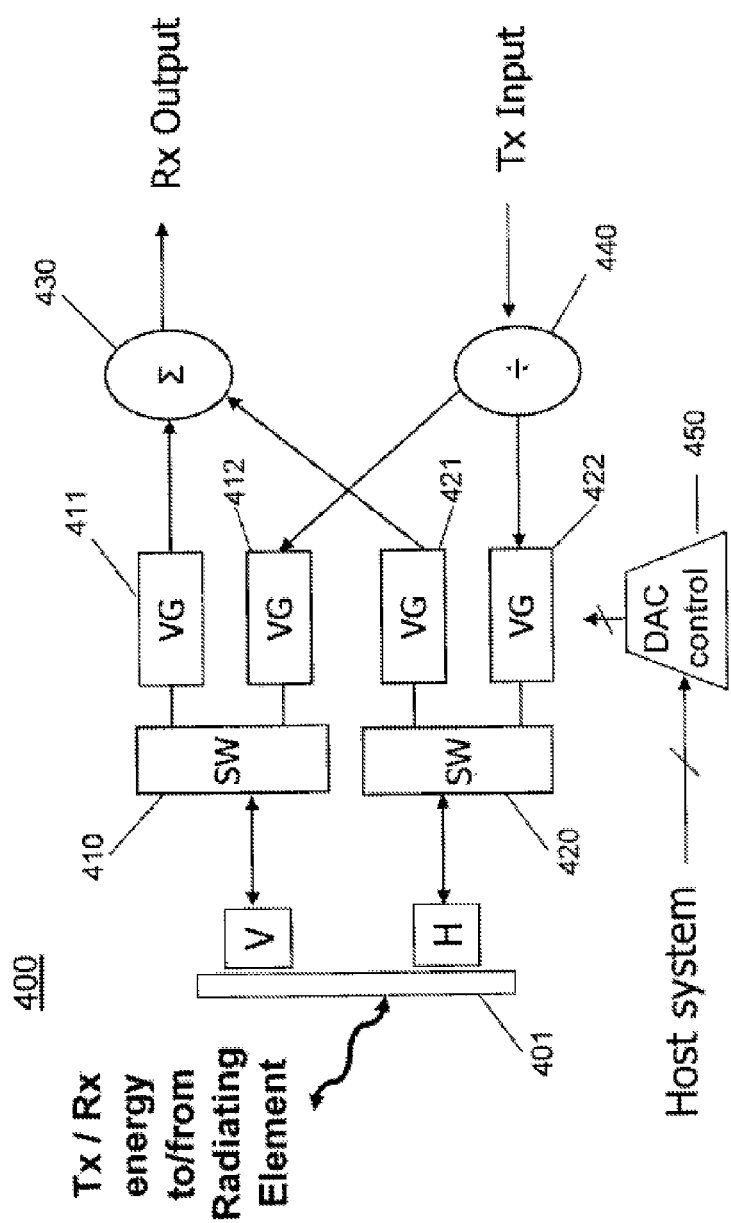
FIG. 4 illustrates an exemplary embodiment of a bidirectional antenna polarizer.

In an exemplary embodiment, and with brief reference to FIG. 4, a bidirectional antenna polarizer comprises two switches, two pairs of vector generators, a power combiner, and a power splitter. The bidirectional antenna polarizer is configured to either transmit or receive an RF signal using the same radiating element. In other words, the bidirectional antenna polarizer is capable of switching between a receive mode and a transmit mode, while communicating via a common radiating element. Moreover, in an exemplary embodiment the radiating element is driven in a single-ended manner, a differential manner, or some combination thereof. Furthermore in an exemplary embodiment, a bidirectional antenna polarizer has two pairs of vector generators configured for both transmitting and receiving, which provides for beam steering and polarization agility in both transmit and receive modes of operation.

Figure 1:
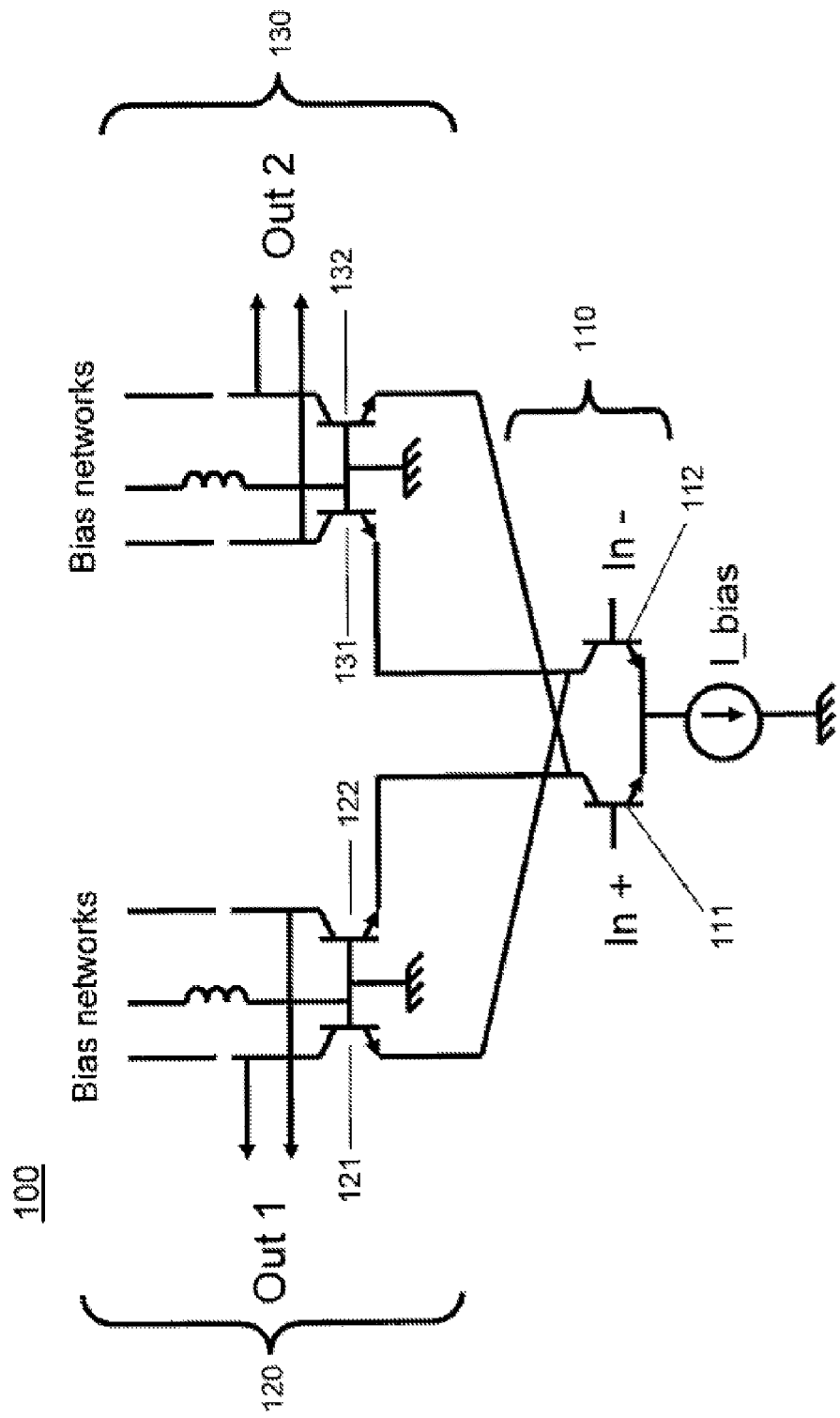
FIG. 1 illustrates an exemplary embodiment of an active power splitter.

Active Splitter: FIG. 1 illustrates a schematic of an exemplary active power splitter. In an exemplary embodiment, an active power splitter 100 comprises a differential input subcircuit 110, a first differential output subcircuit 120, and a second differential output subcircuit 130. The differential input subcircuit 110 has paired transistors 111, 112 with a common emitter node and is constant current biased, as is typical in a differential amplifier. An input signal is communicated to the base of paired transistors 111, 112 in the differential input subcircuit 110. Both the first and second differential output subcircuits 120, 130 comprise a pair of transistors with a common base node and each common base is connected to ground.

The first differential output subcircuit 120 has a first transistor 121 emitter connected to the collector of one of the input subcircuit transistors 112. The emitter of the second output subcircuit transistor 122 is connected to the collector of the other input subcircuit transistor 111. In the exemplary embodiment, the first output is drawn from the collectors of transistors 121, 122 of the first differential output subcircuit 120. Furthermore, the second differential output subcircuit 130 is similarly connected, except the transistor 131, 132 emitters are inversely connected to the input subcircuit transistor 111, 112 collectors with respect to transistors 121, 122.

By inverting the input subcircuit transistor collector connections between the first and second differential output subcircuits, the first output and the second output are approximately 180° out of phase with each other. In another exemplary embodiment, transistor 131, 132 emitters are non-inversely connected to input subcircuit transistor 111, 112 collectors, causing the first output and the second output to be approximately in phase with each other. In general, the absolute phase shift of the output signals through the power splitter is not as important as the relative phasing between the first and second output signals.

In an exemplary embodiment, active power splitter 100 converts an input RF signal into two output signals. The output signal levels may be equal in amplitude, though this is not required. For a prior art passive power splitter, each output signal would be about 3 dB lower in power than the input signal. In contrast, an exemplary active splitter, such as active power splitter 100, can provide gain and the relative power level between the input signal and output signal is adjustable and can be selectively designed. In an exemplary embodiment, the output signal is configured to achieve a substantially neutral or positive power gain over the input signal. For example, the output signal may achieve a 3 dB signal power gain over the input signal. In an exemplary embodiment, the output signal may achieve a power gain in the 0 dB to 5 dB range. Moreover, the output signal may be configured to achieve any suitable power gain.

In accordance with an exemplary embodiment, active power splitter 100 produces output signals with a differential phase between the two signals that is zero or substantially zero. The absolute phase shift of output signals through the active power splitter may not be as important as the differential phasing between the output signals.

In another exemplary embodiment, active power splitter 100 additionally provides matched impedances at the input and output ports. The matched impedances may be 50 ohms, 75 ohms, or other suitable impedances. Furthermore, in an exemplary embodiment, active power splitter 100 provides isolation between the output ports of the active power splitter. In one exemplary embodiment, active power splitter 100 is manufactured as a RFIC with a compact size that is independent of the operating frequency due to a lack of distributed components.

Figure 2:
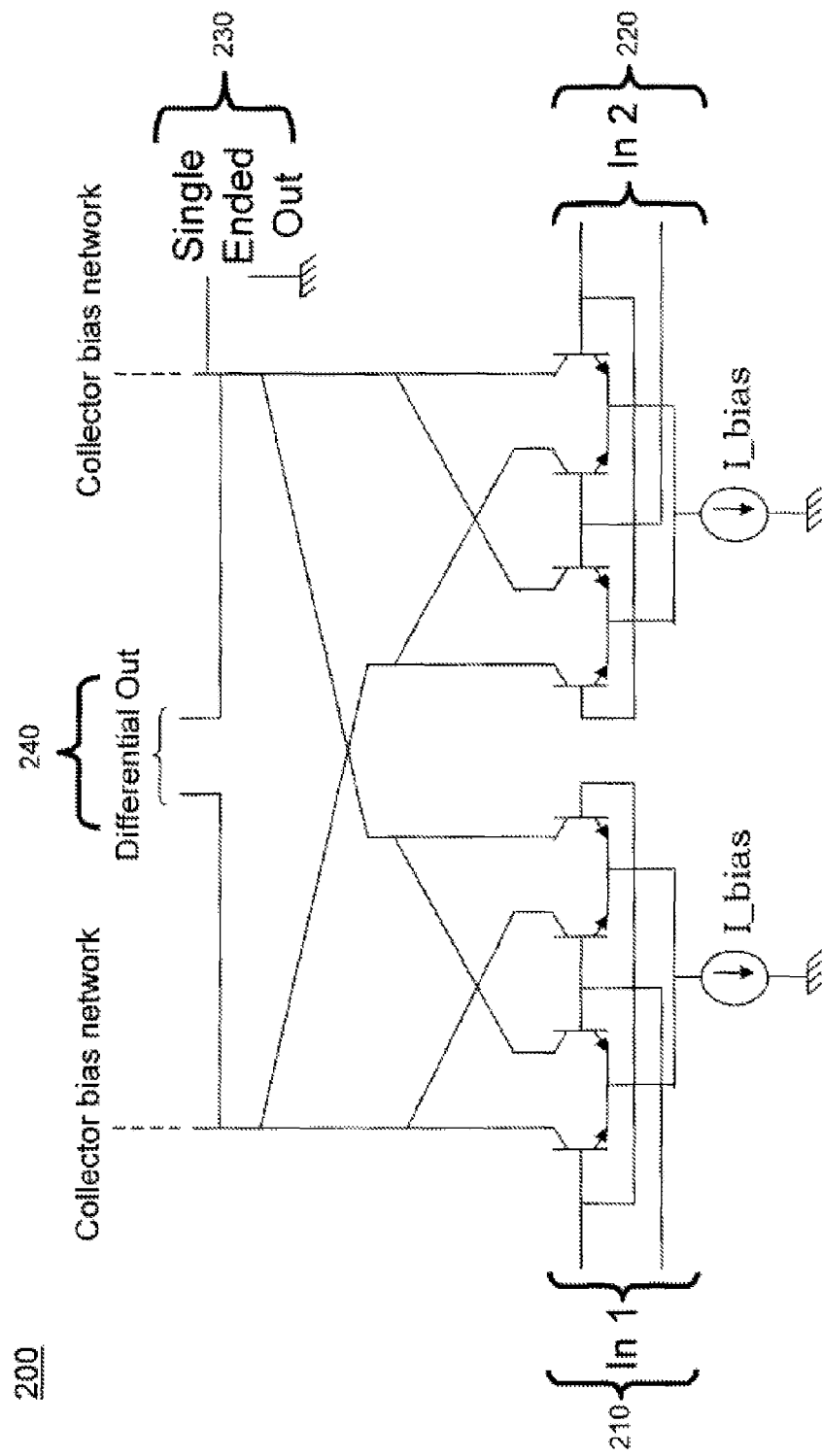
FIG. 2 illustrates an exemplary embodiment of an active power combiner.

Active Combiner: In an exemplary embodiment and with reference to FIG. 2, an active power combiner 200 comprises a first differential input subcircuit 210, a second differential input subcircuit 220, a single ended output subcircuit 230, and a differential output subcircuit 240. Each differential input subcircuit 210, 220 includes two pairs of transistors, with each transistor of each differential input subcircuit 210, 220 having a common emitter node with constant current biasing, as is typical in a differential amplifier.

A first input signal is communicated to the bases of the transistors in first differential input subcircuit 210. For example, a first line of input signal In1 is provided to one transistor of each transistor pair in first differential input subcircuit 210, and a second line of input signal In1 is provided to the other transistor of each transistor pair. Similarly, a second input signal is communicated to the bases of the transistors in second differential input subcircuit 220. For example, a first line of input signal In2 is provided to one transistor of each transistor pair in second differential input subcircuit 220, and a second line of input signal In2 is provided to the other transistor of each transistor pair. Furthermore, in an exemplary embodiment, a differential output signal is formed by a combination of signals from collectors of transistors in first and second differential input subcircuits 210, 220.

In an exemplary embodiment, active power combiner 200 converts two input RF signals into a single output signal. The output signal can either be a single ended output at single ended output subcircuit 230, or a differential output at differential output subcircuit 240. In other words, active power combiner 200 performs a function that is the inverse of active power splitter 100. The input signal levels can be of arbitrary amplitude and phase. Similar to an active power splitter, active power combiner 200 can provide gain and the relative power level between the inputs and output is also adjustable and can be selectively designed. In an exemplary embodiment, the output signal achieves a substantially neutral or positive signal power gain over the input signal. For example, the output signal may achieve a 3 dB power gain over the sum of the input signals. In an exemplary embodiment, the output signal may achieve a power gain in the 0 dB to 5 dB range. Moreover, the output signal may achieve any suitable power gain.

In an exemplary embodiment, active power combiner 200 additionally provides matched impedances at the input and output ports. The matched impedances may be 50 ohms, 75 ohms, or other suitable impedances. Furthermore, in an exemplary embodiment, active power combiner 200 provides isolation between the input ports of the power combiner. In one exemplary embodiment, active power combiner 200 is manufactured as a RFIC with a compact size that is independent of the operating frequency due to a lack of distributed components.

Vector Generator: In an exemplary embodiment, a vector generator converts an RF input signal into an output signal (sometimes referred to as an output vector) that is shifted in phase and/or amplitude to a desired level. This replaces the function of a typical phase shifter and adds the capability of amplitude control. In other words, a vector generator is a magnitude and phase control circuit. In the exemplary embodiment, the vector generator accomplishes this function by feeding the RF input signal into a quadrature network resulting in two output signals that differ in phase by about 90°. The two output signals are fed into parallel quadrant select circuits, and then through parallel variable gain amplifiers (VGAs). In an exemplary embodiment, the quadrant select circuits receive commands and may be configured to either pass the output signals with no additional relative phase shift between them or invert either or both of the output signals by an additional 180°. In this fashion, all four possible quadrants of the 360° continuum are available to both orthogonal signals. The resulting composite output signals from the current summer are modulated in at least one of amplitude and phase.

Figure 3:
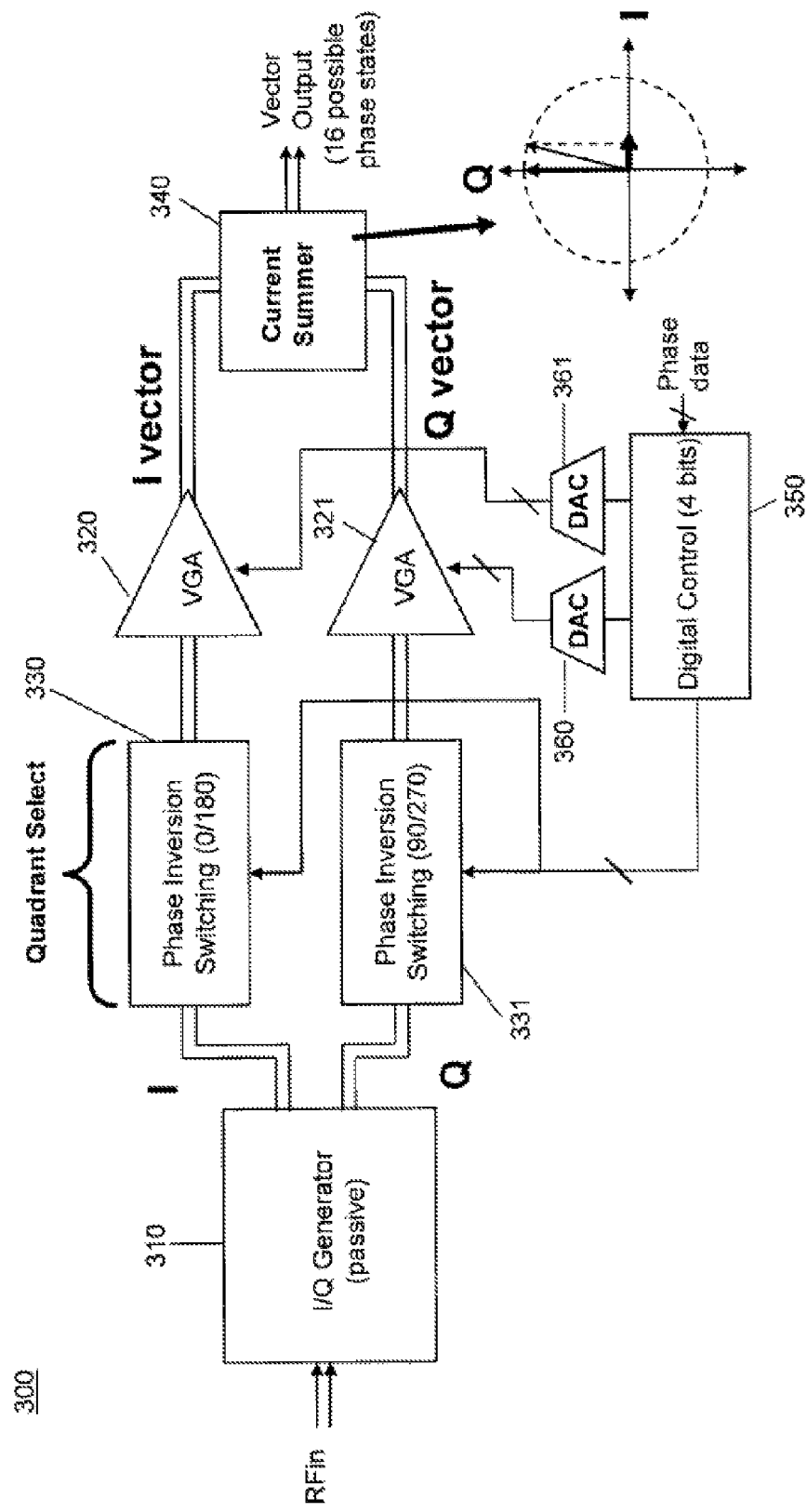
FIG. 3 illustrates an exemplary embodiment of an active vector generator.

In accordance with an exemplary embodiment and with reference to FIG. 3, a vector generator 300 comprises a passive UQ generator 310, a first variable gain amplifier (VGA) 320 and a second VGA 321, a first quadrant select 330 and a second quadrant select 331 each configured for phase inversion switching, and a current summer 340. The first quadrant select 330 is in communication with UQ generator 310 and first VGA 320. The second quadrant select 331 is in communication with UQ generator 310 and second VGA 321. Furthermore, in an exemplary embodiment, vector generator 300 comprises a digital controller 350 that controls a first digital-to-analog converter (DAC) 360 and a second DAC 361. The first and second DACs 360, 361 control first and second VGAs 321, 320, respectively. Additionally, digital controller 350 controls first and second quadrant selects 330, 331.

In an exemplary embodiment, vector generator 300 controls the phase and amplitude of an RF signal by splitting the RF signal into two separate vectors, the in-phase (I) vector and the quadrature-phase (Q) vector. In one embodiment, the RF signal is communicated differentially. The differential RF signal communication may be throughout vector generator 300 or limited to various portions of vector generator 300. In another exemplary embodiment, the RF signals are communicated non-differentially. The I vector and Q vector are processed in parallel, each passing through the phase inverting switching performed by first and second quadrant selects 330, 331. The resultant outputs of the phase inverting switches comprise four possible signals: a non-inverted I, an inverted I, a non-inverted Q, and an inverted Q. In this manner, all four quadrants of a phasor diagram are available for further processing by VGAs 320, 321. In an exemplary embodiment, two of the four possible signals non-inverted I, inverted I, non-inverted Q, and inverted Q are processed respectively through VGAs 320, 321, until the two selected signals are combined in current summer 340 to form a composite RF signal. The current summer 340 outputs the composite RF signal with phase and amplitude adjustments. In an exemplary embodiment, the composite RF signal is in differential signal form. In another exemplary embodiment, the composite RF signals are in single-ended form.

In an exemplary embodiment, control for the quadrant shifting and VGA functions is provided by a pair of DACs. In an exemplary embodiment, reconfiguration of digital controller 350 allows the number of phase bits to be digitally controlled after vector generator 300 is fabricated if adequate DAC resolution and automatic gain control (AGC) dynamic range exists. In an exemplary embodiment with adequate DAC resolution and AGC dynamic range, any desired vector phase and amplitude can be produced with selectable fine quantization steps using digital control. In another exemplary embodiment, reconfiguration of DACs 360, 361 can be made after vector generator 300 is fabricated in order to facilitate adjustment of the vector amplitudes.

In accordance with an exemplary embodiment, a phased array antenna comprises active components manufactured on silicon germanium (SiGe) in a monolithic solution. Other materials may be used, such as GaAs, silicon, or other suitable materials now known or hereinafter devised. A monolithic SiGe embodiment using active components results in certain advantages over the distributed/passive network in the prior art, including lower cost, smaller physical size, wider operating bandwidths, and the ability to provide power gain rather than a power loss.

Moreover, in another exemplary embodiment, the polarization of a phased array radiating element is adjustable by operating two vector generators in parallel and feeding both output signals of the two vector generators to the radiating element in spatially orthogonal fashion. Linear polarization results when one vector drives the radiating element. Circular polarization results when two vectors that are electrically 90° out of phase drive the radiating element in spatially orthogonal fashion. Elliptical polarization results when two vectors that are electrically out of phase by a value other than 90° drive the radiating element in spatially orthogonal fashion.

Additionally, other advantages over the prior art embodiments are possible, depending on the phased array architecture. Some of the advantages include extensive system flexibility and very compact antenna systems because no distributed structures are required. In one embodiment, the size of the control function components of the phased array architecture is compact and independent of operating frequency. Furthermore, some embodiments employ differential signaling to improve signal isolation when the RF signal is in analog form.

Some of the main advantages include that RF signals undergo a neutral or slight positive power gain when being communicated through the antenna system, rather than power losses that occur in the passive prior art systems. Another advantage is that the antenna system is not band limited. In other words, the antenna system is applicable to all frequency bands, including X, K, Ku, Ka, and Q bands. Furthermore, in an exemplary embodiment, the antenna system operates over specific frequency ranges, such as 2-20 GHz, 20-40 GHz, or 30-45 GHz.

Reconfigurability of the antenna system is also an advantage. In an exemplary embodiment, the antenna system includes the ability to reconfigure the number of phase bits in a DAC over full product life. In another exemplary embodiment, the antenna system is able to reconfigure the amplitude taper of the system over full product life. In yet another exemplary embodiment, the antenna system is able to reconfigure the system polarization over full product life. Moreover, in an exemplary embodiment with adequate DAC resolution and AGC dynamic range, any desired vector phase and amplitude can be produced with selectable fine quantization steps using digital control.

Bidirectional Polarizer: In accordance with an exemplary embodiment and with reference to FIG. 4, a bidirectional antenna polarizer 400 comprises a first switch 410 in communication with a first vector generator 411 and a second vector generator 412, and a second switch 420 in communication with a third vector generator 421 and a fourth vector generator 422. In an exemplary embodiment, bidirectional antenna polarizer 400 further comprises an active power combiner 430, an active power splitter 440, and multiple digital-to-analog converter (DAC) controllers 450. In another exemplary embodiment, power combiner 430 and power splitter 440 could be passive distributed components. The DAC controllers 450 are configured to control the vector generators. In one embodiment, one DAC is implemented to drive one vector generator. For example, the vector generators are adjusted to provide at least one of desired beam steering, polarization, and amplitude taper.

In an exemplary embodiment, at least one of switches 410, 420 is a single-pole double-throw (SPDT) switch. In another exemplary embodiment, at least one of switches 410, 420 comprise two single-pole single-throw (SPST) switches. In yet another exemplary embodiment, switches 410, 420 are replaced with one double-pole double-throw switch, which is able to control the signal path connection of up to four vector generators. In still another exemplary embodiment, switches 410, 420 are replaced with two double-pole single-throw switches. Moreover, switches 410, 420 may be any switching device configured to interrupt or complete at least one signal path between radiating element 401 and vector generators 411, 412, 421, 422.

In accordance with an exemplary embodiment, switches 410, 420 are in communication with a radiating element 401 and control signal routing in bidirectional antenna polarizer 400 for transmit and receive modes. The dual switches enable a single radiating element that has two or more feeds to perform both transmit and receive functions. In an exemplary embodiment, each radiating element has two feed ports and results in an unbalanced feed system. In yet another exemplary embodiment, each radiating element has three feed ports and results in a partially balanced feed system. In another exemplary embodiment, each radiating element has four feed ports and results in a fully balanced feed system. In an exemplary embodiment, single radiating element 401 transmits and receives RF signals in a half-duplex fashion.

In the transmit mode, active power splitter 440 divides an input signal into a first transmit input signal and a second transmit input signal. Active power splitter 440 provides the first transmit input signal to vector generator 412 and the second transmit input signal to vector generator 422. The vector generators 412, 422 perform at least one of phase shifting and amplitude adjustment, on the first and second transmit input signals, respectively, for the intended beam steering, polarization and amplitude taper of the radiating element 401. Vector generator 412 generates a first adjusted transmit signal and vector generator 422 generates a second adjusted transmit signal. The first adjusted transmit signal is communicated from vector generators 412 to one of the spatially orthogonal feeds of radiating element 401 via switch 410. Similarly, the second adjusted transmit signal is communicated from vector generators 422 to the other of the spatially orthogonal feeds of radiating element 401 via switch 420.

In the receive mode, radiating element receives a signal that is spatially orthogonally divided into two signals, a first receive signal and a second receive signal. The spatially orthogonal feeds of radiating element 401 communicate the first receive input signal to vector generator 411 via switch 410. Similarly, the spatially orthogonal feeds of radiating element 401 also communicate the second receive input signal to vector generators 421 via switch 420. In an exemplary embodiment, vector generators 411, 421 are configured to phase and amplitude shift the first and second receive input signal, respectively. Vector generator 411 generates a first adjusted receive signal and vector generator 421 generates a second adjusted receive signal.

Furthermore, in an exemplary embodiment, vector generators 411, 421 are in communication with active power combiner 430. Active power combiner receives the first adjusted receive signal from vector generator 411 and the second adjusted receive signal from vector generator 421. The two adjusted receive signals are combined by active power combiner 430 to form a receive output signal.

In accordance with an exemplary embodiment, bidirectional antenna polarizer 400 is capable of beam steering and generating or receiving signals with any polarization. This includes linear, circular, and elliptical polarizations. The signal polarization is controlled by the vector generators, which are in turn controlled by DAC controllers 450. In an exemplary embodiment, DAC controllers 450 are reprogrammable and thus the polarization produced by the vector generators can be changed at anytime, including after fabrication, without physical modification of bidirectional antenna polarizer 400.

Half-Duplex Architecture: In an exemplary embodiment and with reference to FIG. 5, a phased array integrated circuit (IC) 500 in communication with a first radiating element 501 has a transmit mode and a receive mode. The phased array integrated circuit 500 comprises a first transmit-receive switch 510, a second transmit-receive switch 511, a first low-noise amplifier (LNA) 520, a second LNA 522, a first power amplifier 521, and a second power amplifier 523. In an exemplary embodiment, phased array integrated circuit 500 further comprises four vector generators 530, 531, 532, 533, an active power combiner 540, and an active power splitter 541. In an exemplary embodiment, each of vector generators 530, 531, 532, 533 receives a control signal from a digital-to-analog converter (DAC) 550.

In accordance with an exemplary embodiment, transmit-receive switches 510, 511, LNAs 520, 522, and power amplifiers 521, 523 are located on a GaAs chip. Furthermore, vector generators 530, 531, 532, 533, active power combiner 540, and active power splitter 541 are located on a SiGe chip. As mentioned above, SiGe chips are less expensive than GaAs chips, resulting in a less expensive antenna system. Although described as dividing the various components amongst different materials, phased array IC 500 may have all components on GaAs or SiGe material, or some of the vector generators, combiners, or splitters located on the GaAs chip or SiGe chip or any combination thereof. In addition, the architecture and functionality of phased array IC 500 in communication with a second radiating element 502 is substantially similar to that of first radiating element 501 and will not be described in detail.

Figure 5:
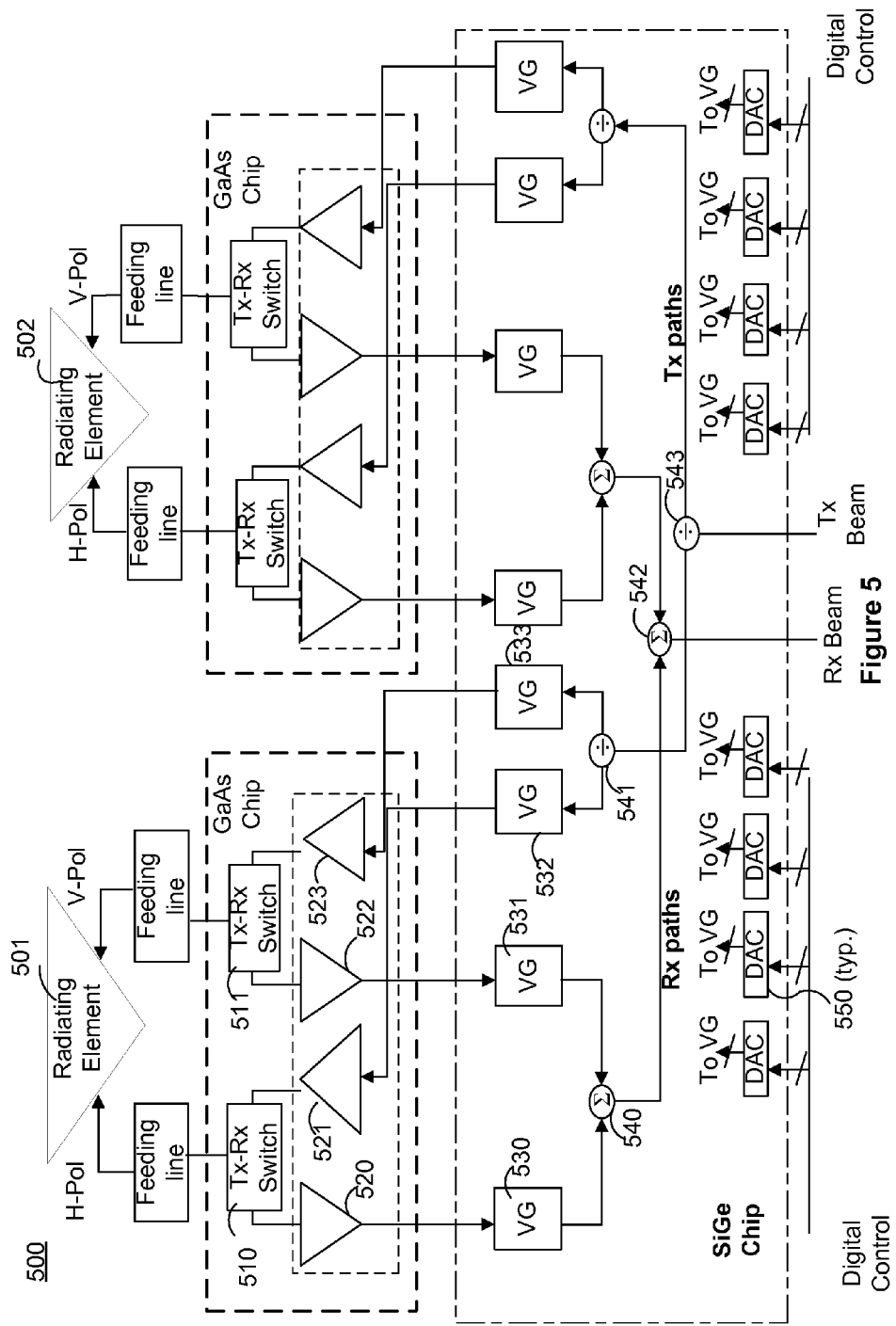
FIG. 5 illustrates an exemplary embodiment of a phased array antenna system with a half-duplex architecture.

In an exemplary embodiment and with continued reference to FIG. 5, phased array IC 500 is configured for half-duplex communications. In one embodiment, phased array IC 500 is in communication with at least two radiating elements, namely first radiating element 501 and second radiating element 502. Although only two radiating elements are illustrated, phased array IC 500 may be in communication with multiple radiating elements. In an exemplary embodiment of phased array IC 500, each radiating element is in communication with a transmit beam path and a receive beam path. In another exemplary embodiment, at least a portion of the transmit beam path and receive beam path is divided for communicating orthogonally polarized signals. Furthermore, in an exemplary embodiment, differential signaling is used in portions or throughout phased array IC 500.

Furthermore, in accordance with an exemplary embodiment, a transmit beam is provided to first radiating element 501 and second radiating element 502. The transmit beam is divided by an active power splitter 543 to the multiple radiating element paths. Each radiating element path receives the transmit beam signal and further divides the signal using a power splitter, for example active power splitter 541. In an exemplary embodiment, the divided transmit beam signals are communicated to two vector generators 532, 533. The vector generators are configured to adjust the phase and/or amplitude of the respective transmit signals. In an exemplary embodiment, one vector generator provides beam steering and the other vector generator provides polarization tracking. Furthermore, any suitable architecture of vector generators configured to provide beam steering and polarization tracking may be implemented. This architecture results in independent polarization flexibility in the transmit mode. In an exemplary embodiment, the respective transmit signals are phase adjusted such that the signals have orthogonal polarization with respect to each other. Furthermore, the transmit path comprises power amplifiers 521, 523 that receive the adjusted transmit signal from vector generators 532, 533, respectively.

In an exemplary embodiment, first transmit-receive switch 510 and second transmit-receive switch 511 are configured to enable the desired signal path during the appropriate mode. In an exemplary embodiment, transmit-receive switches 510, 511 are single-pole double-throw switches. Although described as single-pole double-throw, switches 510, 511 may be any switch or multiple switches configured enabling one signal path and disabling another signal path. Similar to switches 410, 420 of bidirectional antenna polarizer 400, transmit-receive switches 510, 511 may comprises various types of switches and configurations.

In the transmit mode, transmit-receive switch 510 enables the output signal of power amplifier 521 to be communicated to a first feed of first radiating element 501. Similarly, transmit-receive switch 511 enables the output signal of power amplifier 523 to be communicated to a second feed of first radiating element 501. In contrast, in the receive mode, transmit-receive switch 510 enables communication of a first polarized feed of the receive signal from first radiating element 501 to first LNA 520. Similarly, transmit-receive switch 511 enables the communication of a second polarized feed of the receive signal from first radiating element 501 to second LNA 522.

The signal output of first LNA 520 feeds into vector generator 530 and the signal output of second LNA 522 feeds into vector generator 531. Similar to vector generators 532, 533, in an exemplary embodiment, vector generators 530, 531 are configured to adjust the phase and/or amplitude of the respective receive signals. In an exemplary embodiment, one vector generator provides beam steering and the other vector generator provides polarization tracking. This architecture results in independent polarization flexibility in the receive mode.

In an exemplary embodiment, the respective outputs of vector generators 530, 531 are combined at active power combiner 540. The output of vector generators 530, 531 represent the two parts of the polarized receive signal, which are combined to form a single receive signal from first radiating element 501. The combined receive signal from first radiating element 501 is further combined at active power combiner 542 with the other combined receive signal from second radiating element 502 to form a receive beam. Moreover, any number of signals from radiating elements may be combined, including from three or more radiating elements. In an exemplary embodiment, the combined receive signals from all the radiating elements of the single aperture are combined into the receive beam.

Figure 6:
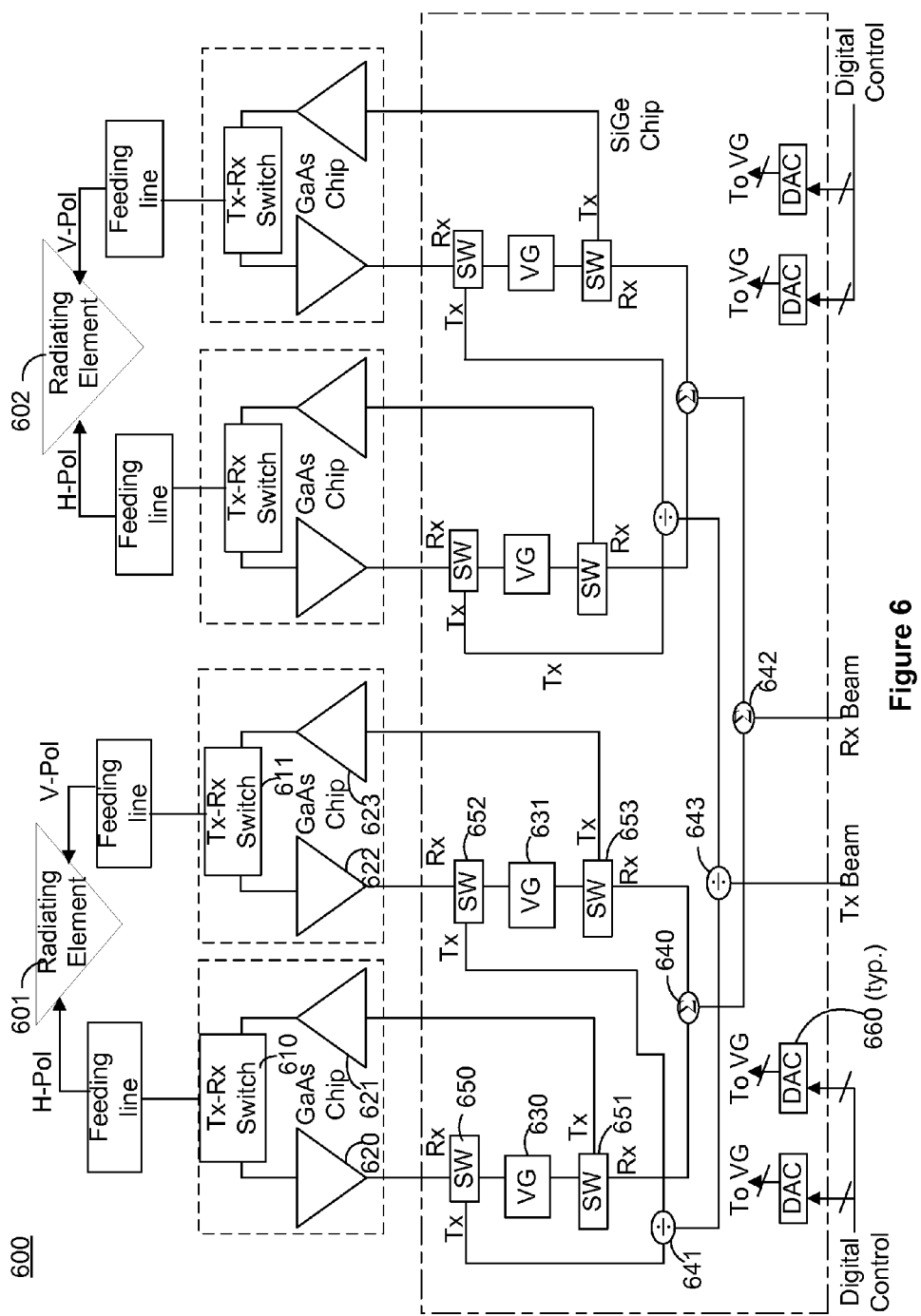
FIG. 6 illustrates an exemplary embodiment of a phased array antenna system with a simplified half-duplex architecture.

In accordance with an exemplary embodiment and with reference to FIG. 6, a simplified phased array integrated circuit (IC) 600 in communication with a first radiating element 601 has a transmit mode and a receive mode. In this exemplary embodiment, common vector generators are used for both transmit and receive functions, which reduces the number of vector generators in the system by half in comparison to phased array IC 500. The reduced number of vector generators results in reduced system complexity while still providing beam steering, polarization tracking, and multi-band capability. Moreover, the digital signal routing complexity is halved. Furthermore, in an exemplary embodiment of phased array IC 600, the circuit complexity per radiating element is reduced so that twice as many radiating elements may be implemented by a single chip of the same complexity as phased array IC 500. Circuit complexity relates to the number of RF, digital, and/or analog functions performed per chip. Moreover, simplified phased array IC 600 may have reduced power consumption due to fewer vector generators, as compared to phased array IC 500.

In an exemplary embodiment, phased array IC 600 comprises a first transmit-receive switch 610, a second transmit-receive switch 611, a first LNA 620, a second LNA 622, a first power amplifier 621, and a second power amplifier 623. In an exemplary embodiment, phased array integrated circuit 600 further comprises a first vector generator 630, a second vector generator 631, an active power combiner 640, and an active power splitter 641. In addition, in an exemplary embodiment, phased array IC 600 comprises vector generator switches 650, 651, 652, 653. In an exemplary embodiment, each of vector generators 630, 631 receives a control signal from a digital-to-analog converter (DAC) 660.

In accordance with an exemplary embodiment, transmit-receive switches 610, 611, LNAs 620, 622, and power amplifiers 621, 623 are located on a GaAs chip. Furthermore, vector generators 630, 631, active power combiner 640, and active power splitter 641 are located on a SiGe chip. Although described as dividing the various components amongst different materials, phased array IC 600 may have all components on GaAs or SiGe material, or some of the vector generators, combiners, or splitters located on the GaAs chip or SiGe chip or any combination thereof. In addition, the architecture and functionality of phased array IC 600 in communication with a second radiating element 602 is substantially similar to that of first radiating element 601 and will not be described in detail.

In an exemplary embodiment and with continued reference to FIG. 6, phased array IC 600 is configured for half-duplex communications. In one embodiment, phased array IC 600 is in communication with at least two radiating elements, namely first radiating element 601 and second radiating element 602. Although only two radiating elements are illustrated, phased array IC 600 may be in communication with multiple radiating elements. In an exemplary embodiment of phased array IC 600, each radiating element is in communication with a transmit beam path and a receive beam path. In an exemplary embodiment, at least a portion of the transmit beam path and receive beam path is divided for communicating orthogonally polarized signals. Furthermore, in an exemplary embodiment, differential signaling is used in portions or throughout phased array IC 600.

In accordance with an exemplary embodiment, a transmit beam is provided to first radiating element 601 and second radiating element 602. The transmit beam is divided by an active power splitter 643 to the multiple radiating element paths. In an exemplary embodiment, each radiating element path receives the transmit beam signal and further divides the signal using a splitter, for example active power splitter 641. In another exemplary embodiment, vector generator switch 650 is configured to transmit the transmit beam signal to vector generator 630 and disable the signal path from LNA 620. Similarly, in the exemplary embodiment, vector generator switch 652 is configured to transmit the transmit beam signal to vector generator 631 and disable the signal path from LNA 622. In other words, the vector generator switches enable and disable various signal paths based on the current mode of the antenna system.

In an exemplary embodiment, the divided transmit beam signals are communicated to two vector generators 630, 631 from vector generator switches 650, 652, respectively. The vector generators are configured to adjust the phase and/or amplitude of the respective transmit signals. In an exemplary embodiment, vector generator switches 650, 652 are single-pole double throw switches. Although described as single-pole double-throw, vector generator switches 650, 652 may be any switch or multiple switches configured enabling one signal path and disabling another signal path. In an exemplary embodiment, one vector generator provides beam steering and the other vector generator provides polarization tracking. This architecture results in independent polarization flexibility in the transmit mode. Furthermore, any suitable architecture of vector generators configured to provide beam steering and polarization tracking may be implemented.

In an exemplary embodiment, the respective transmit signals are phase and amplitude adjusted by vector generators 630, 631. The adjusted transmit signal generated by vector generator 630 is communicated to power amplifier 621, via vector generator switch 651. In addition, the adjusted transmit signal generated by vector generator 631 is communicated to power amplifier 623, via vector generator switch 653. In an exemplary embodiment, vector generator switches 651, 653 are single-pole double throw switches. Although described as single-pole double-throw, vector generator switches 651, 653 may be any switch or multiple switches configured enabling one signal path and disabling another signal path.

In an exemplary embodiment, first transmit-receive switch 610 and second transmit receive switch 611 are configured to enable the desired signal path during the appropriate mode. In an exemplary embodiment, transmit-receive switches 610, 611 are single-pole double-throw switches. Although described as single-pole double-throw, switches 610, 611 may be any switch or multiple switches configured enabling one signal path and disabling another signal path. Similar to switches 410, 420 of bidirectional antenna polarizer 400, transmit-receive switches 610, 611 may comprises various types of switches and configurations.

In the transmit mode, transmit-receive switch 610 enables the output signal of power amplifier 621 to be communicated to a first feed of first radiating element 601. Similarly, transmit-receive switch 611 enables the output signal of power amplifier 623 to be communicated to a second feed of first radiating element 601. In contrast, in the receive mode, transmit-receive switch 610 enables communicating of a first polarized feed of the receive signal from first radiating element 601 to first LNA 620. Similarly, transmit-receive switch 611 enables the communicating of a second polarized feed of the receive signal from first radiating element 601 to second LNA 622.

The signal output of first LNA 620 feeds though vector generator switch 650 into vector generator 630 and the signal output of second LNA 622 feeds through vector generator switch 652 into vector generator 631. In an exemplary embodiment, vector generators 630, 631 are configured to adjust the phase and/or amplitude of the respective receive signals. In an exemplary embodiment, one vector generator provides beam steering and the other vector generator provides polarization tracking. This architecture results in independent polarization flexibility in the transmit mode. Furthermore, any suitable architecture of vector generators configured to provide beam steering and polarization tracking may be implemented.

In an exemplary embodiment, the output of vector generator 630 is communicated through vector generator switch 651 to active power combiner 640 in the receive mode. Furthermore, the output of vector generator 631 is communicated through vector generator switch 653 to active power combiner 640 in the receive mode. The output of vector generators 630, 631 represent the two parts of the polarized receive signal, which are combined to form a single receive signal from first radiating element 601. In an exemplary embodiment, the combined receive signal from first radiating element 601 is combined at active power combiner 642 with the other combined receive signal from second radiating element 602 to form a receive beam. In an exemplary embodiment, the combined receive signals from all the radiating elements of the single aperture are combined into the receive beam.

In an exemplary embodiment, phased array ICs 500, 600 may be cascaded in a monolithic solution. Furthermore, cascading the system enables multi-band operation, such as over the Ku-band and the Ka-band. In exemplary embodiment, phased array ICs 500, 600 support beam steering and multiple polarizations. In addition, the described architectures may be implemented for one dimensional arrays as well as for two dimensional arrays.

System Applications: In accordance with an exemplary embodiment, a single aperture half-duplex antenna system operates in transmit and receive modes at different instances in time. By dividing the operating modes so that there is no simultaneous transmitting and receiving, the transmit and receive signals are isolated from one another. In addition, frequency filters are not needed to separate the signals if utilizing half-duplex communications. In one embodiment, the operating time is symmetric, such that the amount of time in transmit mode is substantially equivalent to the amount of time in receive mode. In another embodiment, the operating time is asymmetric, and more time is assigned to either the transmit or receive mode. The actual time division may be a function of user need and/or data load. In an exemplary embodiment, a half-duplex scheduler is used to de-conflict the transmit and receive time requirements. In an exemplary embodiment, multiple beams at multiple frequencies can be supported without the need for parallel vector generator architectures by varying the time-slot allocations and updating the beam pointing on a time-slot by time-slot basis.

Furthermore, in an exemplary embodiment, a phased array antenna system corrects satellite tracking error by re-zeroing drift in local sensors. One method of correcting the drift is by using sequential lobing in order to determine any error and perform drift correction. In a sequential lobing method, an antenna system checks multiple satellite positions and obtains return information indicating the true satellite position. For example, the antenna system may transmit a signal to five different locations. One of the locations is the satellite position according to the antenna system, along with four surrounding locations. The return information indicates whether any drift in the local sensors is present, and in which direction the correction needs to take place. This drift information may then be used to correct the drift in the antenna system.

In a typical sequential lobing method, all the multiple satellite positions are checked in order. However, checking the satellite position in order may use additional operating time that the antenna system is not communicating data as in normal operations. In accordance with an exemplary embodiment, a sequential lobing procedure is time-interleaved with normal operations and results in little to no disruption of normal operations. Specifically, in the exemplary embodiment the antenna system checks the satellite at a first position, transmits or receives data in normal operation, checks the satellite at a second position, transmits or receives data in normal operation, checks the satellite at a third position, and so on. The position checking of the lobing method can occur in short bursts within the time period of an antenna system switching between transmit and/or receive periods.

In an exemplary embodiment, a phased array antenna system is configured to switch between multiple beams. The multiple beams may be divided between multiple satellites, or the multiple beams may be broadcast from a single satellite. For example, the phased array antenna system may switch between different spot beam satellites. In one embodiment, the beam switching is used to perform load shifting between multiple over-lapping beams.

In another embodiment, the beam switching may be caused by a change in relative position between the satellite and the antenna system. A satellite may be geosynchronous or non-geosynchronous. As used herein, a geosynchronous satellite is a satellite that has the same orbital period as the Earth's rotational period (1 day). Therefore, a geosynchronous satellite appears to remain stationary above the same location on Earth. In contrast, a non-geosynchronous satellite has an orbital period that is different than the Earth's rotational period, resulting in a satellite that is within range of a stationary receiver for a less than continuous period of time.

Regardless of whether the satellite is geosynchronous or non-geosynchronous, beam switching involves various handoff procedures. In general, a handoff procedure involves determining whether the new beam is available, and coordinating the switch from a first (or current) beam to a second (or new) beam.

Figure 7:
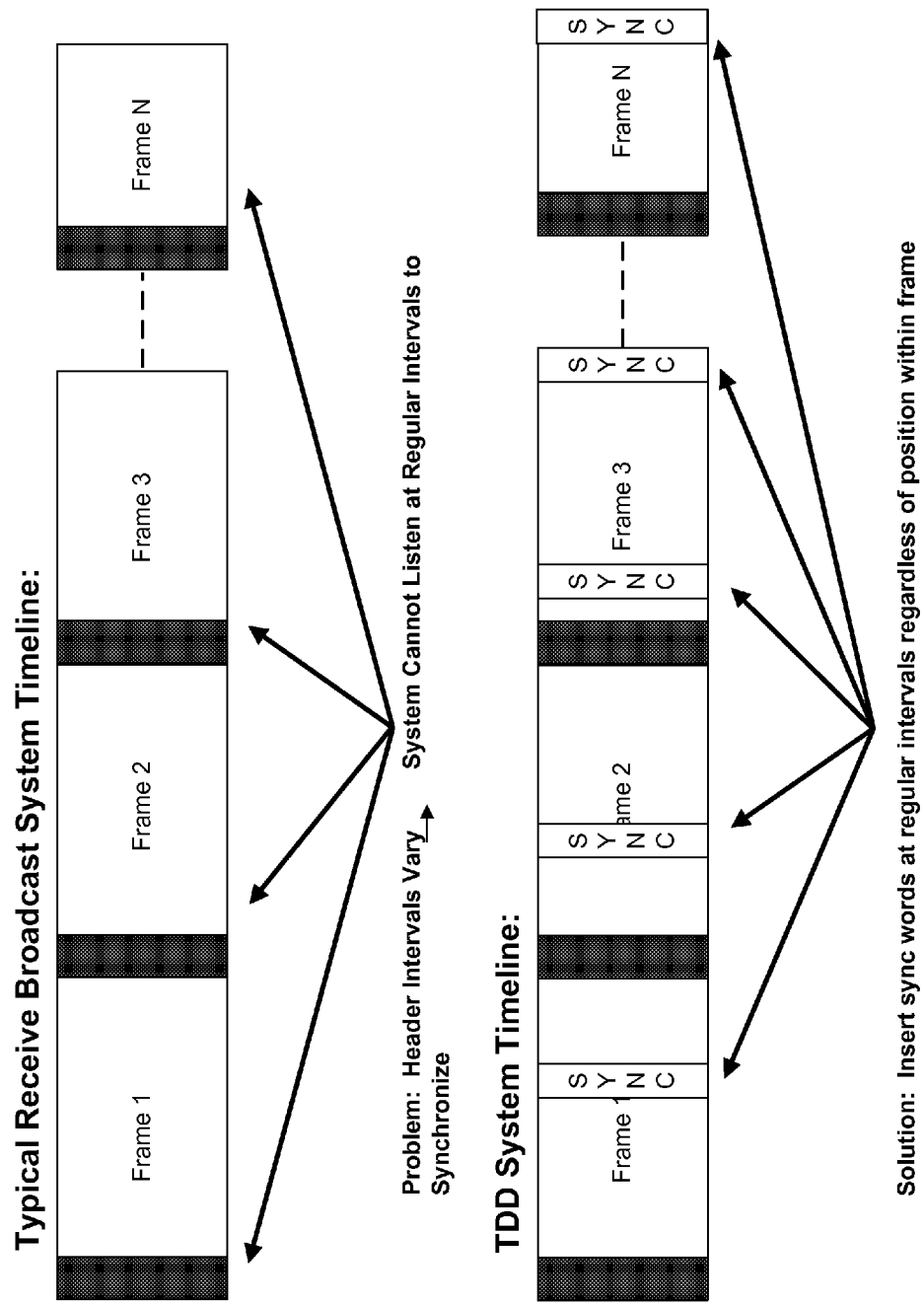
FIG. 7 illustrates an exemplary embodiment of waveform modification.

One aspect of a handoff procedure is the synchronizing of the beams and/or satellites such that the transmit period and receive period are occurring at the same time. If the antenna system is operating in a continuous mode and switching between multiple satellites, then all of the multiple satellites are synchronized in an exemplary embodiment. In one embodiment, synchronized satellites always transmit and receive signals on the same schedule. In another embodiment, synchronized satellites occasionally operate on the same transmit/receive schedule and any handoffs between the satellites occur during the synchronized periods. If the antenna system is operating in a discontinuous mode and switching between multiple satellites, then a period of disruption may occur during the handoff. The disruption period is due to the transmit/receive schedules being different from one satellite to another satellite. To compensate for the disruption, in an exemplary embodiment, an antenna system buffers the data transmissions such that an end user is not aware of the disruption period. Furthermore, in an exemplary embodiment and with reference to FIG. 7, synchronization words are inserted into a signal at regular intervals. In other words, the synchronization words occur at a constant interval. In one embodiment, synchronization words are inserted into a signal every 2.5 milliseconds. In another embodiment, synchronization words are inserted into a signal at a regular interval in the range of 1 to 20 milliseconds. Furthermore, the regular interval of inserting synchronization words may be any suitable time period. The synchronization words modify the waveform and allow for synchronization at known listening intervals. In one exemplary embodiment, the antenna system listens during all synchronization intervals. Information operatively developed from the receive data is used to synchronize the transmit time and frequency on the forward link and to transmit during known "clear" listening intervals. In accordance with an exemplary embodiment, control of transmit and receive intervals for a given terminal is accomplished using specific synchronization words in the forward link waveform.

As previously discussed, in exemplary embodiments the phased array antenna system is not frequency limited but instead is able to communicate over multiple frequencies. In a first embodiment, the antenna system operates over the Ka-, Ku-bands. Specifically, the Ka-band may be defined as 27.5-31.0 GHz and the Ku-band may be defined as 14-14.5 GHz. In a second embodiment, the antenna system operates over the X-, Ka-bands. Specifically, the X-band may be defined as 7.25-8.4 GHz and the Ka-band may be defined as 27.5-31.0 GHz. In a third embodiment, the antenna system operates over the Q-, K-bands. Specifically, the Q-band may be defined as 44-45 GHz and the K-band may be defined as 17.5-21.2 GHz.

4 Color System: In the field of consumer satellite RF communication, a satellite will typically transmit and/or receive data (e.g., movies and other television programming, internet data, and/or the like) to consumers who have personal satellite dishes at their home. More recently, the satellites may transmit/receive data from more mobile platforms (such as, transceivers attached to airplanes, trains, and/or automobiles). It is anticipated that increased use of handheld or portable satellite transceivers will be the norm in the future. Although sometimes described in this document in connection with home satellite transceivers, the prior art limitations now discussed may be applicable to any personal consumer terrestrial transceivers (or transmitters or receivers) that communicate with a satellite.

A propagating radio frequency (RF) signal can have different polarizations, namely linear, elliptical, or circular. Linear polarization consists of vertical polarization and horizontal polarization, whereas circular polarization consists of left-hand circular polarization (LHCP) and right-hand circular polarization (RHCP). An antenna is typically configured to pass one polarization, such as LHCP, and reject the other polarization, such as RHCP.

Also, conventional very small aperture terminal (VSAT) antennas utilize a fixed polarization that is hardware dependant. The basis polarization is generally set during installation of the satellite terminal, at which point the manual configuration of the polarizer hardware is fixed. For example, a polarizer is generally set for LHCP or RHCP and fastened into position. To change polarization in a conventional VSAT antenna might require unfastening the polarizer, rotating it 90° to the opposite circular polarization, and then refastening the polarizer. Clearly this could not be done with much frequency and only a limited number (on the order of 5 or maybe 10) of transceivers could be switched per technician in a given day.

Unlike a typical single polarization antenna, some devices are configured to change polarizations without disassembling the antenna terminal. As an example, a prior embodiment is the use of "baseball" switches to provide electronically commandable switching between polarizations. The rotation of the "baseball" switches causes a change in polarization by connecting one signal path and terminating the other signal path. However, each "baseball" switch requires a separate rotational actuator with independent control circuitry, which increases the cost of device such that this configuration is not used (if at all) in consumer broadband or VSAT terminals, but is instead used for large ground stations with a limited number of terminals.

Furthermore, another approach is to have a system with duplicate hardware for each polarization. The polarization selection is achieved by completing or enabling the path of the desired signal and deselecting the undesired signal. This approach is often used in receive-only terminals, for example satellite television receivers having low-cost hardware. However, with two way terminals that both transmit and receive such as VSAT or broadband terminals, doubling the hardware greatly increases the cost of the terminal.

Conventional satellites may communicate with the terrestrial based transceivers via radio frequency signals at a particular frequency band and a particular polarization. Each combination of a frequency band and polarization is known as a "color". The satellite will transmit to a local geographic area with signals in a "beam" and the geographic area that can access signals on that beam may be represented by "spots" on a map. Each beam/spot will have an associated "color." Thus, beams of different colors will not have the same frequency, the same polarization, or both.

In practice, there is some overlap between adjacent spots, such that at any particular point there may be two, three, or more beams that are "visible" to any one terrestrial transceiver. Adjacent spots will typically have different "colors" to reduce noise/interference from adjacent beams.

In the prior art, broadband consumer satellite transceivers are typically set to one color and left at that setting for the life of the transceiver. Should the color of the signal transmitted from the satellite be changed, all of the terrestrial transceivers that were communicating with that satellite on that color would be immediately stranded or cut off. Typically, a technician would have to visit the consumer's home and manually change out (or possibly physically disassemble and re-assemble) the transceiver or polarizer to make the consumer's terrestrial transceiver once again be able to communicate with the satellite on the new "color" signal. The practical effect of this is that in the prior art, no changes are made to the signal color transmitted from the satellite.

For similar reasons, a second practical limitation is that terrestrial transceivers are typically not changed from one color to another (i.e. if they are changed, it is a manual process). Thus, there is a need for a new low cost method and device to remotely change the frequency and/or polarization of an antenna system. There is also a need for a method and device that may be changed nearly instantaneously and often.

In spot beam communication satellite systems, both frequency and polarization diversity are utilized to reduce interference from adjacent spot beams. In an exemplary embodiment, both frequencies and polarizations are re-used in other beams that are geographically separated to maximize communications traffic capacity. The spot beam patterns are generally identified on a map using different colors to identify the combination of frequency and polarity used in that spot beam. The frequency and polarity re-use pattern is then defined by how many different combinations (or "colors") are used.

Figure 8:
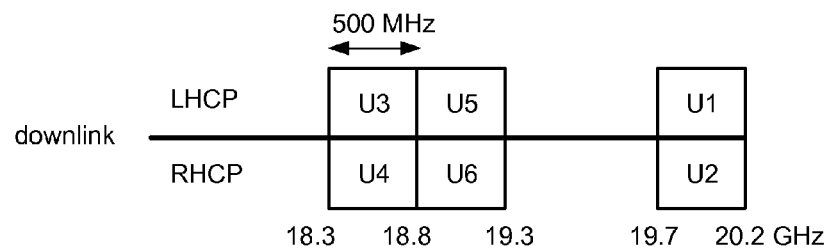
FIG. 8 illustrates an exemplary embodiment of color distribution.
Figure 8:
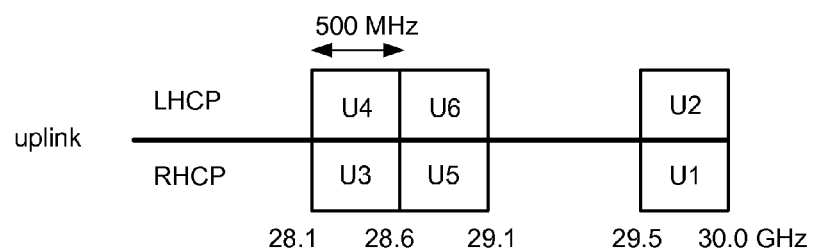
Figure 8:
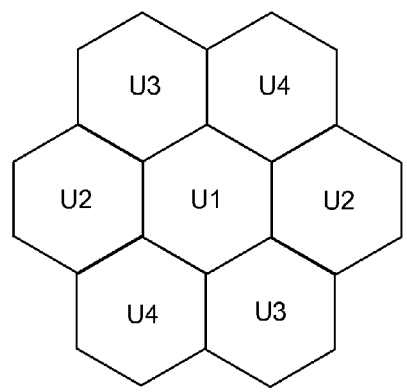
Figure 8:
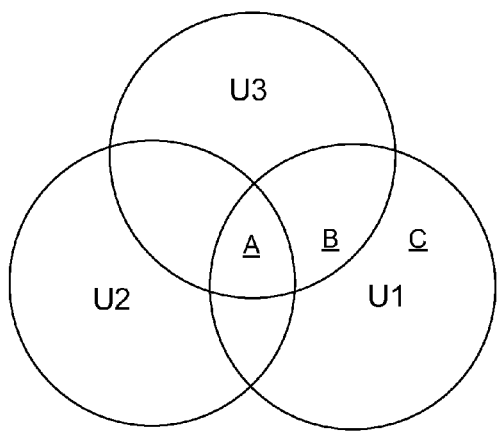

In accordance with various exemplary embodiments and with reference to FIG. 8, an antenna system is configured for frequency and polarization switching. In one specific exemplary embodiment, the frequency and polarization switching comprises switching between two frequency ranges and between two different polarizations. This may be known as four color switching. In other exemplary embodiments, the frequency and polarization switching comprises switching between three frequency ranges and between two different polarizations, for a total of six separate colors. Furthermore, in various exemplary embodiments, the frequency and polarization switching may comprise switching between two polarizations with any suitable number of frequency ranges. In another exemplary embodiment, the frequency and polarization switching may comprise switching between more than two polarizations with any suitable number of frequency ranges.

In accordance with various exemplary embodiments, the ability to perform frequency and polarization switching has many benefits in terrestrial microwave communications terminals. For example, doing so may facilitate increased bandwidth, load shifting, roaming, increased data rate/download speeds, improved overall efficiency of a group of users on the system, or improved individual data communication rates. Terrestrial microwave communications terminals, in one exemplary embodiment, comprise point to point terminals. In another exemplary embodiment, terrestrial microwave communications terminals comprise ground terminals for use in communication with any satellite, such as a satellite configured to switch frequency range and/or polarity of a RF signal broadcasted. These terrestrial microwave communications terminals are spot beam based systems.

In accordance with various exemplary embodiments, a satellite configured to communicate one or more RF signal beams each associated with a spot and/or color has many benefits in microwave communications systems. For example, similar to what was stated above for exemplary terminals in accordance with various embodiments, doing so may facilitate increased bandwidth, load shifting, roaming, increased data rate/download speeds, improved overall efficiency of a group of users on the system, or improved individual data communication rates. In accordance with another exemplary embodiment, the satellite is configured to remotely switch frequency range and/or polarity of a RF signal broadcasted by the satellite. This has many benefits in microwave communications systems. In another exemplary embodiment, satellites are in communications with any suitable terrestrial microwave communications terminal, such as a terminal having the ability to perform frequency and/or polarization switching.

Prior art spot beam based systems use frequency and polarization diversity to reduce or eliminate interference from adjacent spot beams. This allows frequency reuse in non-adjacent beams resulting in increased satellite capacity and throughput. Unfortunately, in the prior art, in order to have such diversity, installers of such systems must be able to set the correct polarity at installation or carry different polarity versions of the terminal. For example, at an installation site, an installer might carry a first terminal configured for left hand polarization and a second terminal configured for right hand polarization and use the first terminal in one geographic area and the second terminal in another geographic area. Alternatively, the installer might be able to disassemble and reassemble a terminal to switch it from one polarization to another polarization. This might be done, for example, by removing the polarizer, rotating it 90°, and reinstalling the polarizer in this new orientation. These prior art solutions are cumbersome in that it is not desirable to have to carry a variety of components at the installation site. Also, the manual disassembly/reassembly steps introduce the possibility of human error and/or defects.

These prior art solutions, moreover, for all practical purposes, permanently set the frequency range and polarization for a particular terminal. This is so because any change to the frequency range and polarization will involve the time and expense of a service call. An installer would have to visit the physical location and change the polarization either by using the disassembly/re-assembly technique or by just switching out the entire terminal. In the consumer broadband satellite terminal market, the cost of the service call can exceed the cost of the equipment and in general manually changing polarity in such terminals is economically unfeasible.

In accordance with various exemplary embodiments, a low cost system and method for electronically or electro-mechanically switching frequency ranges and/or polarity is provided. In an exemplary embodiment, the frequency range and/or polarization of a terminal can be changed without a human touching the terminal. Stated another way, the frequency range and/or polarization of a terminal can be changed without a service call. In an exemplary embodiment, the system is configured to remotely cause the frequency range and/or polarity of the terminal to change.

In one exemplary embodiment, the system and method facilitate installing a single type of terminal that is capable of being electronically set to a desired frequency range from among two or more frequency ranges. Some exemplary frequency ranges include receiving 10.7 GHz to 12.75 GHz, transmitting 13.75 GHz to 14.5 GHz, receiving 18.3 GHz to 20.2 GHz, and transmitting 28.1 GHz to 30.0 GHz. Furthermore, other desired frequency ranges of a point-to-point system fall within 15 GHz to 38 GHz. In another exemplary embodiment, the system and method facilitate installing a single type of terminal that is capable of being electronically set to a desired polarity from among two or more polarities. The polarities may comprise, for example, left hand circular, right hand circular, vertical linear, horizontal linear, or any other orthogonal polarization. Moreover, in various exemplary embodiments, a single type of terminal may be installed that is capable of electronically selecting both the frequency range and the polarity of the terminal from among choices of frequency range and polarity, respectively.

In an exemplary embodiment, transmit and receive signals are paired so that a common switching mechanism switches both signals simultaneously. For example, one "color" may be a receive signal in the frequency range of 19.7 GHz to 20.2 GHz using RHCP, and a transmit signal in the frequency range of 29.5 GHz to 30.0 GHz using LHCP. Another "color" may use the same frequency ranges but transmit using RHCP and receive using LHCP. Accordingly, in an exemplary embodiment, transmit and receive signals are operated at opposite polarizations. However, in some exemplary embodiments, transmit and receive signals are operated on the same polarization which increases the signal isolation requirements for self-interference free operation.

Thus, a single terminal type may be installed that can be configured in a first manner for a first geographical area and in a second manner for a second geographical area that is different from the first area, where the first geographical area uses a first color and the second geographical area uses a second color different from the first color.

In accordance with an exemplary embodiment, a terminal, such as a terrestrial microwave communications terminal, may be configured to facilitate load balancing. In accordance with another exemplary embodiment, a satellite may be configured to facilitate load balancing. Load balancing involves moving some of the load on a particular satellite, or point-to-point system, from one polarity/frequency range "color" or "beam" to another. In an exemplary embodiment, the load balancing is enabled by the ability to remotely switch frequency range and/or polarity of either the terminal or the satellite.

Thus, in exemplary embodiments, a method of load balancing comprises the steps of remotely switching frequency range and/or polarity of one or more terrestrial microwave communications terminals. For example, system operators or load monitoring computers may determine that dynamic changes in system bandwidth resources has created a situation where it would be advantageous to move certain users to adjacent beams that may be less congested. In one example, those users may be moved back at a later time as the loading changes again. In an exemplary embodiment, this signal switching (and therefore this satellite capacity "load balancing") can be performed periodically. In other exemplary embodiments, load balancing can be performed on many terminals (e.g., hundreds or thousands of terminals) simultaneously or substantially simultaneously. In other exemplary embodiments, load balancing can be performed on many terminals without the need for thousands of user terminals to be manually reconfigured.

In one exemplary embodiment, dynamic control of signal polarization is implemented for secure communications by utilizing polarization hopping. Communication security can be enhanced by changing the polarization of a communications signal at a rate known to other authorized users. An unauthorized user will not know the correct polarization for any given instant and if using a constant polarization, the unauthorized user would only have the correct polarization for brief instances in time. A similar application to polarization hopping for secure communications is to use polarization hopping for signal scanning. In other words, the polarization of the antenna can be continuously adjusted to monitor for signal detection.

In an exemplary embodiment, the load balancing is performed as frequently as necessary based on system loading. For example, load balancing could be done on a seasonal basis. For example, loads may change significantly when schools, colleges, and the like start and end their sessions. As another example, vacation seasons may give rise to significant load variations. For example, a particular geographic area may have a very high load of data traffic. This may be due to a higher than average population density in that area, a higher than average number of transceivers in that area, or a higher than average usage of data transmission in that area. In another example, load balancing is performed on an hourly basis. Furthermore, load balancing could be performed at any suitable time. In one example, if maximum usage is between 6-7 PM then some of the users in the heaviest loaded beam areas could be switched to adjacent beams in a different time zone. In another example, if a geographic area comprises both office and home terminals, and the office terminals experience heaviest loads at different times than the home terminals, the load balancing may be performed between home and office terminals. In yet another embodiment, a particular area may have increased localized signal transmission traffic, such as related to high traffic within businesses, scientific research activities, graphic/video intensive entertainment data transmissions, a sporting event or a convention. Stated another way, in an exemplary embodiment, load balancing may be performed by switching the color of any subgroup(s) of a group of transceivers.

In an exemplary embodiment, the consumer broadband terrestrial terminal is configured to determine, based on preprogrammed instructions, what colors are available and switch to another color of operation. For example, the terrestrial terminal may have visibility to two or more beams (each of a different color). The terrestrial terminal may determine which of the two or more beams is better to connect to. This determination may be made based on any suitable factor. In one exemplary embodiment, the determination of which color to use is based on the data rate, the download speed, and/or the capacity on the beam associated with that color. In other exemplary embodiments, the determination is made randomly, or in any other suitable way.

This technique is useful in a geographically stationary embodiment because loads change over both short and long periods of time for a variety of reasons and such self adjusting of color selection facilitates load balancing. This technique is also useful in mobile satellite communication as a form of "roaming". For example, in one exemplary embodiment, the broadband terrestrial terminal is configured to switch to another color of operation based on signal strength. This is, in contrast to traditional cell phone type roaming, where that roaming determination is based on signal strength. In contrast, here, the color distribution is based on capacity in the channel. Thus, in an exemplary embodiment, the determination of which color to use may be made to optimize communication speed as the terminal moves from one spot to another. Alternatively, in an exemplary embodiment, a color signal broadcast by the satellite may change or the spot beam may be moved and still, the broadband terrestrial terminal may be configured to automatically adjust to communicate on a different color (based, for example, on channel capacity).

Figure 9A:
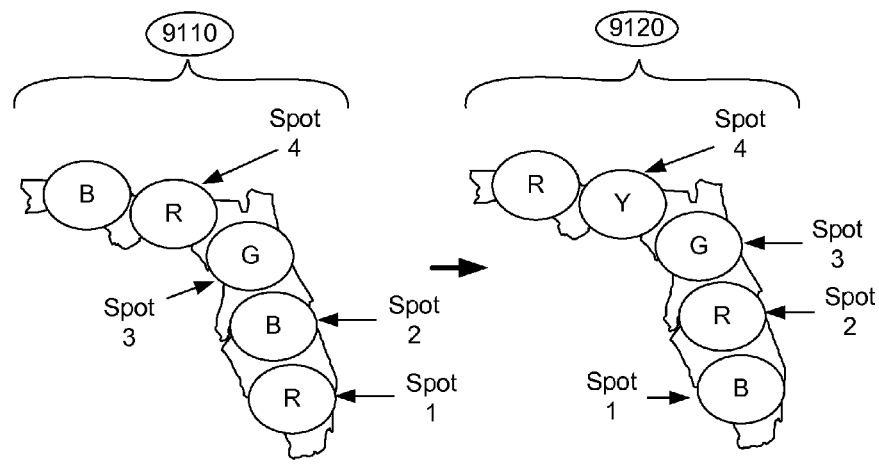
FIGS. 9A-9C illustrate various satellite spot beam multi-color agility methods in accordance with exemplary embodiments.

In accordance with another exemplary embodiment, a satellite is configured to communicate one or more RF signal beams each associated with a spot and/or color. In accordance with another exemplary embodiment, the satellite is configured to remotely switch frequency range and/or polarity of a RF signal broadcasted by the satellite. In another exemplary embodiment, a satellite may be configured to broadcast additional colors. For example, an area and/or a satellite might only have 4 colors at a first time, but two additional colors, (making 6 total colors) might be dynamically added at a second time. In this event, it may be desirable to change the color of a particular spot to one of the new colors. With reference to FIG. 9A, spot 4 changes from "red" to then new color "yellow". In one exemplary embodiment, the ability to add colors may be a function of the system's ability to operate, both transmit and/or receive over a wide bandwidth within one device and to tune the frequency of that device over that wide bandwidth.

In accordance with an exemplary embodiment, and with renewed reference to FIG. 8, a satellite may have a downlink, an uplink, and a coverage area. The coverage area may be comprised of smaller regions each corresponding to a spot beam to illuminate the respective region. Spot beams may be adjacent to one another and have overlapping regions. A satellite communications system has many parameters to work: (1) number of orthogonal time or frequency slots (defined as color patterns hereafter); (2) beam spacing (characterized by the beam roll-off at the cross-over point); (3) frequency re-use patterns (the re-use patterns can be regular in structures, where a uniformly distributed capacity is required); and (4) numbers of beams (a satellite with more beams will provide more system flexibility and better bandwidth efficiency). Polarization may be used as a quantity to define a re-use pattern in addition to time or frequency slots. In one exemplary embodiment, the spot beams may comprise a first spot beam and a second spot beam. The first spot beam may illuminate a first region within a geographic area, in order to send information to a first plurality of subscriber terminals. The second spot beam may illuminate a second region within the geographic area and adjacent to the first region, in order to send information to a second plurality of subscriber terminals. The first and second regions may overlap.

The first spot beam may have a first characteristic polarization. The second spot beam may have a second characteristic polarization that is orthogonal to the first polarization. The polarization orthogonality serves to provide an isolation quantity between adjacent beams. Polarization may be combined with frequency slots to achieve a higher degree of isolation between adjacent beams and their respective coverage areas. The subscriber terminals in the first beam may have a polarization that matches the first characteristic polarization. The subscriber terminals in the second beam may have a polarization that matches the second characteristic polarization.

The subscriber terminals in the overlap region of the adjacent beams may be optionally assigned to the first beam or to the second beam. This optional assignment is a flexibility within the satellite system and may be altered through reassignment following the start of service for any subscriber terminals within the overlapping region. The ability to remotely change the polarization of a subscriber terminal in an overlapping region illuminated by adjacent spot beams is an important improvement in the operation and optimization of the use of the satellite resources for changing subscriber distributions and quantities. For example it may be an efficient use of satellite resources and improvement to the individual subscriber service to reassign a user or a group of users from a first beam to a second beam or from a second beam to a first beam. Satellite systems using polarization as a quantity to provide isolation between adjacent beams may thus be configured to change the polarization remotely by sending a signal containing a command to switch or change the polarization from a first polarization state to a second orthogonal polarization state. The intentional changing of the polarization may facilitate reassignment to an adjacent beam in a spot beam satellite system using polarization for increasing a beam isolation quantity.

The down link may comprise multiple "colors" based on combinations of selected frequency and/or polarizations. Although other frequencies and frequency ranges may be used, and other polarizations as well, an example is provided of one multicolor embodiment. For example, and with renewed reference to FIG. 8, in the downlink, colors U1, U3, and U5 are Left-Hand Circular Polarized ("LHCP") and colors U2, U4, and U6 are Right-Hand Circular Polarized ("RHCP"). In the frequency domain, colors U3 and U4 are from 18.3-18.8 GHz; U5 and U6 are from 18.8-19.3 GHz; and U1 and U2 are from 19.7-20.2 GHz. It will be noted that in this exemplary embodiment, each color represents a 500 MHz frequency range. Other frequency ranges may be used in other exemplary embodiments. Thus, selecting one of LHCP or RHCP and designating a frequency band from among the options available will specify a color. Similarly, the uplink comprises frequency/polarization combinations that can be each designated as a color. Often, the LHCP and RHCP are reversed as illustrated, providing increased signal isolation, but this is not necessary. In the uplink, colors U1, U3, and U5 are RHCP and colors U2, U4, and U6 are LHCP. In the frequency domain, colors U3 and U4 are from 28.1-28.6 GHz; U5 and U6 are from 28.6-29.1 GHz; and U1 and U2 are from 29.5-30.0 GHz. It will be noted that in this exemplary embodiment, each color similarly represents a 500 MHz frequency range.

In an exemplary embodiment, the satellite may broadcast one or more RF signal beam (spot beam) associated with a spot and a color. This satellite is further configured to change the color of the spot from a first color to a second, different, color. Thus, with renewed reference to FIG. 9A, spot 1 is changed from "red" to "blue".

When the color of one spot is changed, it may be desirable to change the colors of adjacent spots as well. Again with reference to FIG. 9A, the map shows a group of spot colors at a first point in time, where this group at this time is designated 9110, and a copy of the map shows a group of spot colors at a second point in time, designated 9120. Some or all of the colors may change between the first point in time and the second point in time. For example spot 1 changes from red to blue and spot 2 changes from blue to red. Spot 3, however, stays the same. In this manner, in an exemplary embodiment, adjacent spots are not identical colors.

Some of the spot beams are of one color and others are of a different color. For signal separation, the spot beams of similar color are typically not located adjacent to each other. In an exemplary embodiment, and with reference again to FIG. 8, the distribution pattern illustrated provides one exemplary layout pattern for four color spot beam frequency reuse. It should be recognized that with this pattern, color U1 will not be next to another color U1, etc. It should be noted, however, that typically the spot beams will over lap and that the spot beams may be better represented with circular areas of coverage. Furthermore, it should be appreciated that the strength of the signal may decrease with distance from the center of the circle, so that the circle is only an approximation of the coverage of the particular spot beam. The circular areas of coverage may be overlaid on a map to determine what spot beam(s) are available in a particular area.

In accordance with an exemplary embodiment, the satellite is configured to shift one or more spots from a first geographic location to a second geographic location. This may be described as shifting the center of the spot from a first location to a second location. This might also be described as changing the effective size (e.g. diameter) of the spot. In accordance with an exemplary embodiment, the satellite is configured to shift the center of the spot from a first location to a second location and/or change the effective size of one or more spots. In the prior art, it would be unthinkable to shift a spot because such an action would strand terrestrial transceivers. The terrestrial transceivers would be stranded because the shifting of one or more spots would leave some terrestrial terminals unable to communicate with a new spot of a different color.

However, in an exemplary embodiment, the transceivers are configured to easily switch colors. Thus, in an exemplary method, the geographic location of one or more spots is shifted and the color of the terrestrial transceivers may be adjusted as needed.

Figures 9B, 9C:
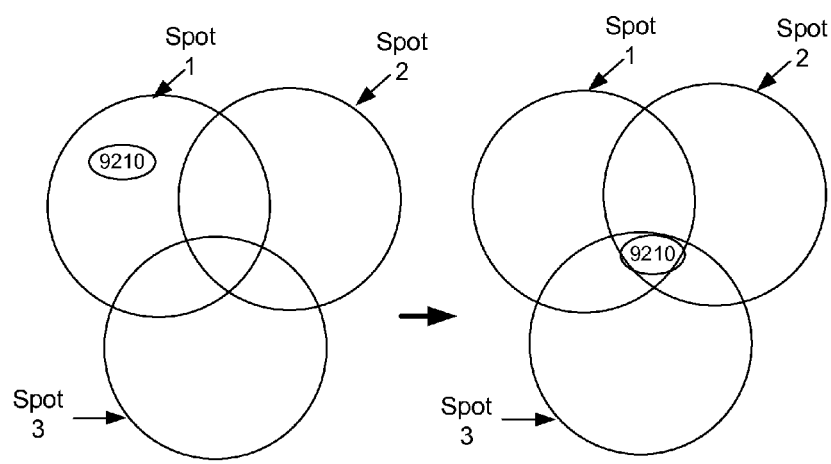

In an exemplary embodiment, the spots are shifted such that a high load geographic region is covered by two or more overlapping spots. For example, with reference to FIGS. 9B and 9C, a particular geographic area 9210 may have a very high load of data traffic. In this exemplary embodiment, area 9210 is only served by spot 1 at a first point in time illustrated by FIG. 9B. At a second point in time illustrated by FIG. 9C, the spots have been shifted such that area 9210 is now served or covered by spots 1, 2, and 3. In this embodiment, terrestrial transceivers in area 9210 may be adjusted such that some of the transceivers are served by spot 1, others by spot 2, and yet others by spot 3. In other words, transceivers in area 9210 may be selectively assigned one of three colors. In this manner, the load in this area can be shared or load-balanced.

In an exemplary embodiment, the switching of the satellites and/or terminals may occur with any regularity. For example, the polarization may be switched during the evening hours, and then switched back during business hours to reflect transmission load variations that occur over time. In an exemplary embodiment, the polarization may be switched thousands of times during the life of elements in the system.

In one exemplary embodiment, the color of the terminal is not determined or assigned until installation of the terrestrial transceiver. This is in contrast to units shipped from the factory set as one particular color. The ability to ship a terrestrial transceiver without concern for its "color" facilitates simpler inventory processes, as only one unit (as opposed to two or four or more) need be stored. In an exemplary embodiment, the terminal is installed, and then the color is set in an automated manner (i.e. the technician can't make a human error) either manually or electronically. In another exemplary embodiment, the color is set remotely such as being assigned by a remote central control center. In another exemplary embodiment, the unit itself determines the best color and operates at that color.

As can be noted, the determination of what color to use for a particular terminal may be based on any number of factors. The color may based on what signal is strongest, based on relative bandwidth available between available colors, randomly assigned among available colors, based on geographic considerations, based on temporal considerations (such as weather, bandwidth usage, events, work patterns, days of the week, sporting events, and/or the like), and or the like. Previously, a terrestrial consumer broadband terminal was not capable of determining what color to use based on conditions at the moment of install or quickly, remotely varied during use.

In accordance with an exemplary embodiment, the system is configured to facilitate remote addressability of subscriber terminals. In one exemplary embodiment, the system is configured to remotely address a specific terminal. The system may be configured to address each subscriber terminal. In another exemplary embodiment, a group of subscriber terminals may be addressable. This may occur using any number of methods now known, or hereafter invented, to communicate instructions with a specific transceiver and/or group of subscriber terminals. Thus, a remote signal may command a terminal or group of terminals to switch from one color to another color. The terminals may be addressable in any suitable manner. In one exemplary embodiment, an IP address is associated with each terminal. In an exemplary embodiment, the terminals may be addressable through the modems or set top boxes (e.g. via the internet). Thus, in accordance with an exemplary embodiment, the system is configured for remotely changing a characteristic polarization of a subscriber terminal by sending a command addressed to a particular terminal. This may facilitate load balancing and the like. The sub-group could be a geographic sub group within a larger geographic area, or any other group formed on any suitable basis In this manner, an individual unit may be controlled on a one to one basis. Similarly, all of the units in a sub-group may be commanded to change colors at the same time. In one embodiment, a group is broken into small sub-groups (e.g., 100 sub groups each comprising 1% of the terminals in the larger grouping). Other sub-groups might comprise 5%, 10%, 20%, 35%, 50% of the terminals, and the like. The granularity of the subgroups may facilitate more fine tuning in the load balancing.

Thus, an individual with a four color switchable transceiver that is located at location A on the map (see FIG. 8, Practical Distribution Illustration), would have available to them colors U1, U2, and U3. The transceiver could be switched to operate on one of those three colors as best suits the needs at the time. Likewise, location B on the map would have colors U1 and U3 available. Lastly, location C on the map would have color U1 available. In many practical circumstances, a transceiver will have two or three color options available in a particular area.

It should be noted that colors U5 and U6 might also be used and further increase the options of colors to use in a spot beam pattern. This may also further increase the options available to a particular transceiver in a particular location. Although described as a four or six color embodiment, any suitable number of colors may be used for color switching as described herein. Also, although described herein as a satellite, it is intended that the description is valid for other similar remote communication systems that are configured to communicate with the transceiver.

The frequency range/polarization of the terminal may be selected at least one of remotely, locally, manually, or some combination thereof. In one exemplary embodiment, the terminal is configured to be remotely controlled to switch from one frequency range/polarization to another. For example, the terminal may receive a signal from a central system that controls switching the frequency range/polarization. The central system may determine that load changes have significantly slowed down the left hand polarized channel, but that the right hand polarized channel has available bandwidth. The central system could then remotely switch the polarization of a number of terminals. This would improve channel availability for switched and non-switched users alike. Moreover, the units to switch may be selected based on geography, weather, use characteristics, individual bandwidth requirements, and/or other considerations. Furthermore, the switching of frequency range/polarization could be in response to the customer calling the company about poor transmission quality.

It should be noted that although described herein in the context of switching both frequency range and polarization, benefits and advantages similar to those discussed herein may be realized when switching just one of frequency or polarization.

The frequency range switching described herein may be performed in any number of ways. In an exemplary embodiment, the frequency range switching is performed electronically. For example, the frequency range switching may be implemented by adjusting phase shifters in a phased array, switching between fixed frequency oscillators or converters, and/or using a tunable dual conversion transmitter comprising a tunable oscillator signal. Additional aspects of frequency switching for use with the present invention are disclosed in U.S. application Ser. No. 12/614,293 entitled "DUAL CONVERSION TRANSMITTER WITH SINGLE LOCAL OSCILLATOR" which was filed on Nov. 6, 2009; the contents of which are hereby incorporated by reference in their entirety.

In accordance with another exemplary embodiment, the polarization switching described herein may be performed in any number of ways. In an exemplary embodiment, the polarization switching is performed electronically by adjusting the relative phase of signals at orthogonal antenna ports.

As described herein, the terminal may be configured to receive a signal causing switching and the signal may be from a remote source. For example, the remote source may be a central office. In another example, an installer or customer can switch the polarization using a local computer connected to the terminal which sends commands to the switch. In another embodiment, an installer or customer can switch the polarization using the television set-top box which in turn sends signals to the switch. The polarization switching may occur during installation, as a means to increase performance, or as another option for troubleshooting poor performance.

In other exemplary embodiments, manual methods may be used to change a terminal from one polarization to another. This can be accomplished by physically moving a switch within the housing of the system or by extending the switch outside the housing to make it easier to manually switch the polarization. This could be done by either an installer or customer.

Some exemplary embodiments of the above mentioned multi-color embodiments may benefits over the prior art. For instance, in an exemplary embodiment, a low cost consumer broadband terrestrial terminal antenna system may include an antenna, a transceiver in signal communication with the antenna, and a polarity switch configured to cause the antenna system to switch between a first polarity and a second polarity. In this exemplary embodiment, the antenna system may be configured to operate at the first polarity and/or the second polarity.

In an exemplary embodiment, a method of system resource load balancing is disclosed. In this exemplary embodiment, the method may include the steps of: (1) determining that load on a first spot beam is higher than a desired level and that load on a second spot beam is low enough to accommodate additional load; (2) identifying, as available for switching, consumer broadband terrestrial terminals on the first spot beam that are in view of the second spot beam; (3) sending a remote command to the available for switching terminals; and (4) switching color in said terminals from the first beam to the second beam based on the remote command. In this exemplary embodiment, the first and second spot beams are each a different color.

In an exemplary embodiment, a satellite communication system is disclosed. In this exemplary embodiment, the satellite communication system may include: a satellite configured to broadcast multiple spot beams; a plurality of user terminal antenna systems in various geographic locations; and a remote system controller configured to command at least some of the subset of the plurality of user terminal antenna systems to switch at least one of a polarity and a frequency to switch from the first spot beam to the second spot beam. In this exemplary embodiment, the multiple spot beams may include at least a first spot beam of a first color and a second spot beam of a second color. In this exemplary embodiment, at least a subset of the plurality of user terminal antenna systems may be located within view of both the first and second spot beams.

The following applications are related to this subject matter: U.S. application Ser. No. 12/759,123, entitled "ACTIVE BUTLER AND BLASS MATRICES"; U.S. application Ser. No. 12/759,043, entitled "ACTIVE HYBRIDS FOR ANTENNA SYSTEMS"; U.S. application Ser. No. 12/759,064, entitled "ACTIVE FEED FORWARD AMPLIFIER"; U.S. application Ser. No. 12/759,130, entitled "ACTIVE PHASED ARRAY ARCHITECTURE"; U.S. application Ser. No. 12/758,996, entitled "PRESELECTOR AMPLIFIER"; U.S. application Ser. No. 12/759,148, entitled "ACTIVE POWER SPLITTER"; U.S. application Ser. No. 12/759,059, entitled "MULTI-BEAM ACTIVE PHASED ARRAY ARCHITECTURE"; U.S. application Ser. No. 12/759,113, entitled "DIGITAL AMPLITUDE CONTROL OF ACTIVE VECTOR GENERATOR"; the contents of which are hereby incorporated by reference for any purpose in their entirety. Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "includes," "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

What is claimed is:

1. An antenna polarizer comprising:
  a first switching circuit including a first vector generator, the first vector generator to adjust a first transmit signal and a first receive signal communicated with a first feed port of a radiating element;
  a second switching circuit including a second vector generator, the second vector generator to adjust a second transmit signal and a second receive signal communicated with a second feed port of the radiating element;
  wherein the first and second switching circuits selectively form one of:
  a first transmit path through the first vector generator for the first transmit signal, and a second transmit path through the second vector generator for the second transmit signal; and
  a first receive path through the first vector generator for the first receive signal, and a second receive path through the second vector generator for the second receive signal;
  a splitter to divide an input signal into the first transmit signal and the second transmit signal, and to provide the first transmit signal to the first switching circuit and provide the second transmit signal to the second switching circuit; and
  a combiner to combine the first receive signal from the first switching circuit and the second receive signal from the second switching circuit to form an output signal.

2. The antenna polarizer of claim 1, wherein:
  the first transmit path through the first vector generator is the same as the first receive path through the first vector generator; and
  the second transmit path through the second vector generator is the same as the second receive path through the second vector generator.

3. The antenna polarizer of claim 1, wherein:
  the first switching circuit further includes a first switch and a second switch separated by the first vector generator, wherein the first and second switches enable one of the first transmit path and the first receive path through the first vector generator, and disable the other of the first transmit path and the first receive path through the first vector generator; and
  the second switching circuit further includes a third switch and a fourth switch separated by the second vector generator, wherein the third and fourth switches enable one of the second transmit path and the second receive path through the second vector generator, and disable the other of the second transmit path and the second receive path.

4. The antenna polarizer of claim 3, wherein:
  the first transmit path includes a first terminal of the first vector generator selectively coupled to the splitter via the first switch, and a second terminal of the first vector generator selectively coupled to the first feed port via the second switch; and
  the first receive path includes the first terminal of the first vector generator selectively coupled to the first feed port via the first switch, and the second terminal of the first vector generator selectively coupled to the combiner via the second switch.

5. The antenna polarizer of claim 1, wherein the first and second vector generators adjust the first and second transmit signals and the first and second receive signals such that the output signal corresponds to a propagating signal polarization of the radiating element that is orthogonal to that of the input signal.

6. The antenna polarizer of claim 1, wherein the first feed port of the radiating element corresponds to a first basis polarization, and the second feed port of the radiating element corresponds to a second basis polarization.

7. The antenna polarizer of claim 1, wherein each of the first vector generator and the second vector generator comprise:
  a first quadrant select in parallel with a second quadrant select; and
  a first variable gain amplifier in parallel with a second variable gain amplifier.

8. The antenna polarizer of claim 1, wherein:
  the first vector generator adjusts at least one of amplitude and phase of the first transmit signal and the first receive signal in response to digital commands; and
  the second vector generator adjusts at least one of amplitude and phase of the second transmit signal and the second receive signal in response to digital commands.

9. The antenna polarizer of claim 1, further comprising:
  a first transmit-receive switch coupled between the first switching circuit and the first feed port of the radiating element; and
  a second transmit-receive switch coupled between the second switching circuit and the second feed port of the radiating element.

10. An antenna polarizer comprising:
  a first switching circuit in communication with a first feed port of a radiating element, the first switching circuit to selectively form one of a first transmit path through the first switching circuit for a first transmit signal communicated with the first feed port, and a first receive path through the first switching circuit for a first receive signal communicated with the first feed port, wherein the first transmit path and the first receive path include a common first vector generator to adjust the first transmit signal and the first receive signal;

a second switching circuit in communication with a second feed port of the radiating element, the second switching circuit to selectively form one of a second transmit path through the second switching circuit for a second transmit signal communicated with the second feed port, and a second receive path through the second switching circuit for a second receive signal communicated with the second feed port, wherein the second transmit path and the second receive path include a common second vector generator to adjust the second transmit signal and the second receive signal;

a splitter to divide an input signal into the first transmit signal and the second transmit signal, and to provide the first transmit signal to the first switching circuit and provide the second transmit signal to the second switching circuit; and a combiner to combine the first receive signal from the first switching circuit and the second receive signal from the second switching circuit to form an output signal.

11. The antenna polarizer of claim 10, wherein:
the first transmit path through the common first vector generator is the same as the first receive path through the common first vector generator; and
the second transmit path through the common second vector generator is the same as the second receive path through the common second vector generator.

12. The antenna polarizer of claim 10, wherein:
the first switching circuit further includes a first switch and a second switch separated by the common first vector generator, wherein the first and second switches enable one of the first transmit path and the first receive path, and disable the other of the first transmit path and the first receive path; and
the second switching circuit further includes a third switch and a fourth switch separated by the common second vector generator, wherein the third and fourth switches enable one of the second transmit path and the second receive path, and disable the other of the second transmit path and the second receive path.

13. The antenna polarizer of claim 12, wherein:
the first transmit path includes a first terminal of the common first vector generator selectively coupled to the splitter via the first switch, and a second terminal of the common first vector generator selectively coupled to the first feed port via the second switch; and
the first receive path includes the first terminal of the common first vector generator selectively coupled to the first feed port via the first switch, and the second terminal of the common first vector generator selectively coupled to the combiner via the second switch.

14. The antenna polarizer of claim 10, wherein the common first and second vector generators adjust the first and second transmit signals and the first and second receive signals such that the output signal corresponds to a propagating signal polarization of the radiating element that is orthogonal to that of the input signal.

15. The antenna polarizer of claim 10, wherein the first feed port of the radiating element corresponds to a first basis polarization, and the second feed port of the radiating element corresponds to a second basis polarization.

16. The antenna polarizer of claim 10, wherein each of the common first vector generator and the common second vector generator comprise:
a first quadrant select in parallel with a second quadrant select; and
a first variable gain amplifier in parallel with a second variable gain amplifier.

17. The antenna polarizer of claim 10, wherein:
the common first vector generator adjusts at least one of amplitude and phase of the first transmit signal and the first receive signal in response to digital commands; and
the common second vector generator adjusts at least one of amplitude and phase of the second transmit signal and the second receive signal in response to digital commands.

18. The antenna polarizer of claim 10, further comprising:
a first transmit-receive switch coupled between the first switching circuit and the first feed port of the radiating element; and
a second transmit-receive switch coupled between the second switching circuit and the second feed port of the radiating element.

* * * * *